(12) United States Patent  
Nakashima et al.

(10) Patent No.: US 8,744,276 B2
(45) Date of Patent: Jun. 3, 2014

(54) OPTICAL RECEIVING APPARATUS AND DIGITAL RECEIVING CIRCUIT

(75) Inventors: Hisao Nakashima, Kawasaki (JP); Takeshi Hoshida, Kawasaki (JP); Takahito Tanimura, Kawasaki (JP); Lei Li, Beijing (CN); Ling Liu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 872 days.

(21) Appl. No.: 12/408,176

(22) Filed: Mar. 20, 2009

(65) Prior Publication Data

US 2009/0317092 A1      Dec. 24, 2009

(30) Foreign Application Priority Data

Jun. 19, 2008  (JP) ................................. 2008-160431

(51) Int. Cl.
    *H04B 10/00* (2013.01)
(52) U.S. Cl.
    USPC ........... 398/204; 398/202; 398/205; 398/206; 398/207
(58) Field of Classification Search
    USPC ........................................ 398/202, 204–207
    See application file for complete search history.

(56) References Cited

U.S. PATENT DOCUMENTS

| 7,356,256 | B1 * | 4/2008 | Strawczynski et al. ......... 398/33 |
| 7,486,898 | B2 * | 2/2009 | Bulow .......................... 398/209 |
| 7,899,340 | B1 * | 3/2011 | Bontu et al. ................... 398/209 |
| 8,036,541 | B2 * | 10/2011 | Toyoshima et al. ........... 398/204 |
| 2006/0051100 | A1 | 3/2006 | Watanabe ...................... 398/152 |
| 2006/0245766 | A1 | 11/2006 | Taylor ........................... 398/208 |
| 2006/0285855 | A1 * | 12/2006 | Sun et al. ....................... 398/155 |
| 2007/0230518 | A1 | 10/2007 | Watanabe ........................ 372/22 |

FOREIGN PATENT DOCUMENTS

| EP | 1933478 | 6/2008 |
| JP | 2006-184851 | 7/2006 |
| JP | 2007-264319 | 10/2007 |
| WO | 2004/054138 | 6/2004 |
| WO | 2007/045070 A1 | 4/2007 |
| WO | 2007/045072 | 4/2007 |

OTHER PUBLICATIONS

Lim, Dongmin et al., *A Modified Gardner Detector for Symbol Timing Recovery of M-PSK Signals*, IEEE Transactions on Communications, vol. 52, No. 10, pp. 1643-1647.
Liu, Xiang et al., *DSP-Enhanced Differential Direct-Detection for DQPSK and m-ary DPSK*, ECOC (European Conference on Optical Communication) (4 pp.).
Ly-Gagnon, Dany-Sebastien et al., *Coherent Detection of Optical Quadrature Phase-Shift Keying Signals With Carrier Phase Estimation*, Journal of Lightwave Technology, vol. 24, No. 1, pp. 12-21.
Extended European Search Report, mailed Jun. 15, 2009, in corresponding European Application No. 09004533.7 (7 pp.).
Japanese Office Action issued Jul. 24, 2012 in corresponding Japanese Patent Application No. 2008-160431.

* cited by examiner

*Primary Examiner* — Yuanda Zhang
*Assistant Examiner* — Michael Carter
(74) *Attorney, Agent, or Firm* — Staas & Halsey LLP

(57) ABSTRACT

An optical receiving apparatus includes a combining unit that combines signal light and reference light; a optoelectric converting unit that converts, into electrical signals, two or more optical signals that enable reconstruction of a complex electric field signal of the signal light obtained by the combining unit; and a sampling clock generating unit that generates a sampling clock that has a frequency preset based on a symbol rate of the signal light and is asynchronous with the signal light. The optical receiving apparatus further includes a digital converting unit that samples at the frequency of the sampling clock signal, an electrical signal obtained by the optoelectric converting unit and converts the electrical signal into a digital signal; and a digital signal processing unit that demodulates a received signal based on a complex digital signal obtained from the digital signal obtained by the digital converting unit.

13 Claims, 22 Drawing Sheets

OPTICAL RECEIVING APPARATUS AND DIGITAL RECEIVING CIRCUIT

CROSS REFERENCE TO RELATED APPLICATIONS

This application is based upon and claims the benefit of priority of the prior Japanese Patent Application No. 2008-160431, filed on Jun. 19, 2008, the entire contents of which are incorporated herein by reference.

FIELD

The embodiments discussed herein are related to a optical receiving apparatus that receives signal light and a digital receiving circuit.

BACKGROUND

In conventional optical communication, a direct detection scheme that utilizes ON/OFF of a light intensity to perform communication is generally used. However, with the recent spread of the Internet, a communication scheme having a larger transmission capacity is demanded in a backbone optical communication system in particular, and a digital coherent reception scheme having a combination of an optical coherent reception scheme with a higher reception sensitivity than the direct detection scheme and a digital signal processing technology has gained attention (see, e.g., Liu, Xiang, "DSP-Enhanced Differential Direct-Detection for DQPSK and m-ary DPSK", European Conference on Optical Communication (ECOC) 2007, 7.2.1; and Ly-Gagnon, Dany-Sebastien; Tsukamoto, Satoshi; Katoh, Kazuhiro; and Kikuchi, Kazuro, Member, IEEE, Member, OSA, "Coherent Detection of Optical Quadrature Phase-Shift Keying Signals With Carrier Phase Estimation", JOURNAL OF LIGHTWAVE TECHNOLOGY, Vol. 24, No. 1, January 2006, pp. 12-21).

The digital coherent reception scheme is a scheme that combines a received optical signal with reference light to convert intensity and phase information of the received optical signal into an extractable signal, converts this signal into a digital signal by an analog/digital converter (ADC), extracts the intensity and phase information of the optical signal from the converted digital signal, and performs digital signal processing with respect to the extracted signal, thereby demodulating the received signal. As the reference light, a received signal delayed for one symbol time may be used, or light (local light) output from another laser provided on a reception side may be used.

Digital coherent reception is characterized in that highly accurate phase control of the reference light is not required as compared with a conventional coherent reception scheme because digital signal processing technology is used to compensate phase difference of the received signal and the reference light without performing optical phase synchronization of the received optical signal and the reference light. Further, highly accurate waveform distortion compensation can be performed by an electrical equalizing filter since information indicative of both amplitude and phase of an optical electric field of the received optical signal can be acquired as an electrical signal.

As a modulation scheme when using digital coherent light reception, not only a binary modulation scheme as typified by intensity modulation but also multi-ary phase shift keying (MPSK), e.g., differential quadrature phase shift keying (DQPSK) or quadrature amplitude modulation (QAM) can be realized by the same receiver configuration.

As a general method for recovering a clock in a digital signal processing circuit, two methods can be considered. When a clock recovery unit is provided on an upstream side of a waveform distortion compensator in the digital signal processing circuit, because a signal on the upstream side of the waveform distortion compensator has a distorted waveform, occasionally a sampling clock signal cannot be recovered when waveform distortion is severe. Thus, the ADC cannot perform digital conversion.

Even if the clock signal can be recovered, since the quality of the recovered clock signal is poor, accuracy of digital conversion in the ADC is reduced. Conversely, provision of the clock recovery unit on a downstream side of the waveform distortion compensator of the digital signal processing circuit can be considered; however, loop delay of the recovered clock signal to the ADC increases. Hence, there is a problem in that the quality of the clock signal is poor and accuracy of digital conversion is reduced.

SUMMARY

According to an aspect of an embodiment, an optical receiving apparatus includes a combining unit that combines signal light and reference light; an optoelectric converting unit that converts, into electrical signals, two or more optical signals that enable reconstruction of a complex electric field signal of the signal light obtained by the combining unit; and a sampling clock generating unit that generates a sampling clock that has a frequency preset based on a symbol rate of the signal light and is asynchronous with the signal light. The optical receiving apparatus further includes a digital converting unit that samples at the frequency of the sampling clock signal, an electrical signal obtained by the optoelectric converting unit and converts the electrical signal into a digital signal; and a digital signal processing unit that demodulates a received signal based on a complex digital signal obtained from the digital signal obtained by the digital converting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to the accompanying drawings.

Figure 1:
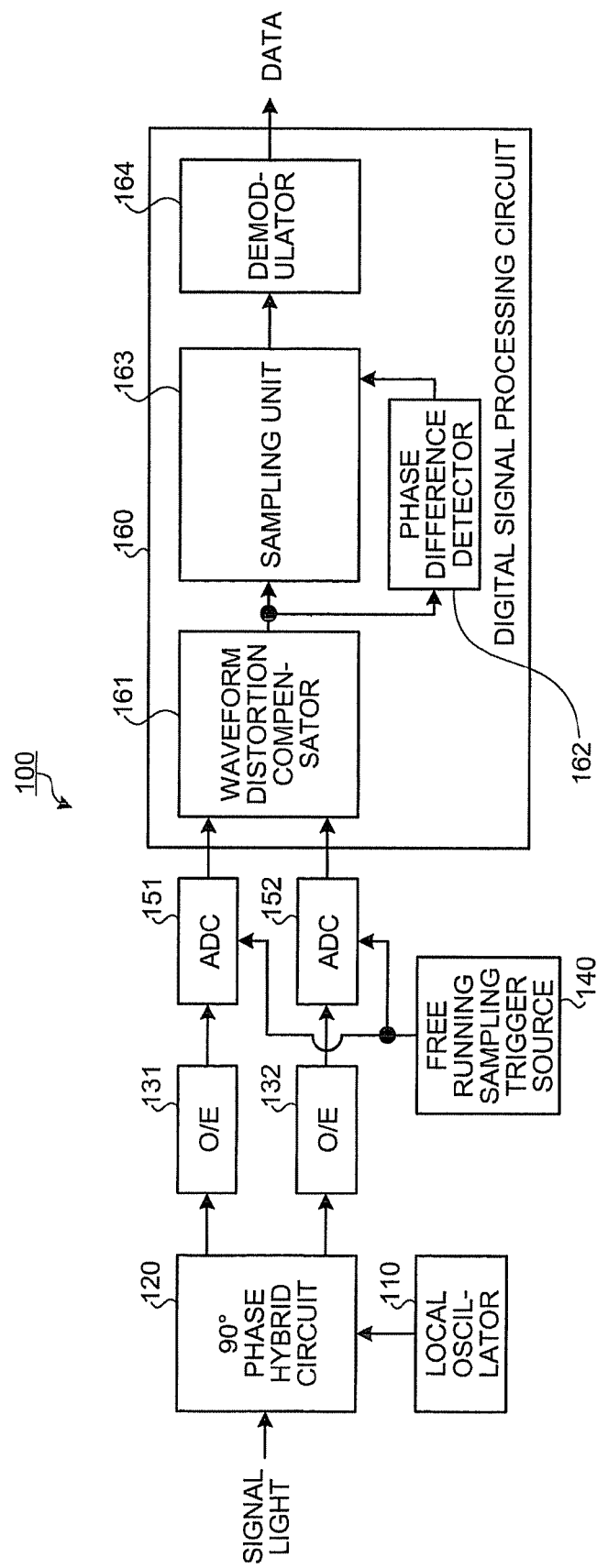
FIG. 1 is a block diagram of an optical receiving apparatus according to a first embodiment.

FIG. 1 is a block diagram of an optical receiving apparatus according to a first embodiment. As depicted in FIG. 1, an optical receiving apparatus 100 according to the first embodiment includes a local oscillator 110, a 90° phase hybrid circuit 120, an optoelectric (O/E) converter 131, an O/E converter 132, a free running sampling trigger source 140, an ADC 151, an ADC 152, and a digital signal processing circuit 160.

The optical receiving apparatus 100 adopts a coherent scheme that uses the 90° phase hybrid circuit 120. The local oscillator 110, the 90° phase hybrid circuit 120, the O/E converter 131, and the O/E converter 132 form an O/E converting unit that combines received signal light with reference light and converts two or more optical signals that can reconstruct a complex electric field signal of the signal light obtained from combining the received signal light with reference light.

Specifically, the local oscillator 110, the 900 phase hybrid circuit 120, the O/E converter 131, and the O/E converter 132 convert into electrical signals, an optical signal having a component identical to a phase of local-oscillator-output-light in the received signal light and an optical signal using light that is shifted 90° from the phase of the local oscillator output light as a reference, i.e., signals indicative of complex electric fields of the received signal. Local light output from the local oscillator 110 is input to the 90° phase hybrid circuit 120.

The 90° phase hybrid circuit 120 receives the received signal light and the local light (reference light) output from the local oscillator 110. The 90° phase hybrid circuit 120 uses the input local light to extract complex electric fields of the input signal light.

The 90° phase hybrid circuit 120 outputs light (I component) having an intensity corresponding to a real part in the extracted complex electric fields to the O/E converter 131. The 90° phase hybrid circuit 120 outputs light (Q component) having an intensity corresponding to an imaginary part in the extracted complex electric fields to the O/E converter 132.

The O/E converter 131 receives light output from the 90° phase hybrid circuit 120, and outputs an electrical signal corresponding to the intensity of the received light to the ADC 151. The O/E converter 132 receives light output from the 90° phase hybrid circuit 120, and outputs an electrical signal corresponding to the intensity of the received light to the ADC 152. The O/E converter 131 and the O/E converter 132 are, for example, photodiodes (PDs).

The free running sampling trigger source 140 is a free running sampling clock generating unit that oscillates a clock signal that determines the timing for sampling. The free running sampling trigger source 140 outputs an oscillated clock signal to the ADC 151 and the ADC 152, respectively. The clock signal becomes a signal that is asynchronous with respect to the signal light. A symbol rate of the signal light received by the optical receiving apparatus 100 is determined as Fc. A frequency of the clock signal oscillated by the free running sampling trigger source 140 is determined as a sampling frequency Fs.

The sampling frequency Fs is previously set based on the signal symbol rate Fc. Specifically, the sampling frequency Fs is set to a value close to an integral multiple Fc/2×N (N=1, 2, 3, . . . ) of a half of the signal symbol rate Fc. However, since the clock signal of the free running sampling trigger source 140 is of a free running type, the sampling frequency Fs becomes an integral multiple Fc/2×N+α (α≠0, an absolute value of α is less than Fc/2×N) of a half of the signal symbol rate Fc.

The ADC 151 is a digital converting unit that performs digital conversion involving the sampling of an electrical signal output from the O/E converter 131 at the timing of the clock signal output from the free running sampling trigger source 140. The ADC 152 is a digital converting unit that performs digital conversion involving the sampling of an electrical signal output from the O/E converter 132 at the timing of the clock signal output from the free running sampling trigger source 140.

Specifically, the ADC 151 and the ADC 152 respectively sample an electrical signal according to the timing of the clock signal from the free running sampling trigger source 140, and quantizes each sampled signal, thereby effecting digital conversion. The ADC 151 and the ADC 152 respectively output to the digital signal processing circuit 160, a digital signal subjected to digital conversion. Electric field information concerning a received signal obtained by the digital signal or by reconstructing the digital signal will be referred to as a complex digital signal in the following explanation.

The digital signal processing circuit 160 performs digital processing with respect to each digital signal output from the ADC 151 and the ADC 152. The digital signal processing circuit 160 includes a waveform distortion compensator 161, a phase difference detector 162, a sampling unit 163, and a demodulator 164. The digital signal processing circuit 160 is a digital circuit, for example, a central processing unit (CPU).

In the digital signal processing circuit 160, each digital signal input as a signal I or a signal Q respectively from the ADC 151 and the ADC 152 is processed respectively; however, the signal I and the signal Q are treated as a single complex digital signal.

The waveform distortion compensator 161 performs waveform distortion compensation with respect to the received optical signal based on digital signal processing using the complex digital signal output from the ADC 151 and the ADC 152. The waveform distortion compensator 161 executes, e.g., wavelength dispersion compensation or polarization mode dispersion (PMD) compensation. The waveform distortion compensator 161 outputs the complex digital signal having a wavelength subjected to distortion compensation to the phase difference detector 162 and the sampling unit 163, respectively.

The phase difference detector 162 detects a phase difference between the received signal light and the clock signal output from the free running sampling trigger source 140 based on the complex digital signal output from the waveform distortion compensator 161. For example, the phase difference detector 162 can detect a phase difference between the received signal light and the clock signal from the free running sampling trigger source 140 by monitoring a change in intensity of the complex digital signal output from the waveform distortion compensator 161.

Specifically, when an intensity of the complex digital signal is constant, the phase difference detector 162 determines that there is no phase difference between the signal light and the clock signal. When a change in intensity of the complex digital signal is abrupt, the phase difference detector 162 determines that a phase difference between the signal light and the clock signal is large. The phase difference detector 162 outputs a signal indicative of the detected phase difference to the sampling unit 163.

Concerning details of phase comparison by the phase difference detector 162, reference may be directed to, for example, "Modified Gardner Detector", IEEE TRANSACTIONS ON COMMUNICATIONS, Vol. 52, No. 10, October 2004, A Modified Gardner Detector for Symbol Timing Recovery of M-PSK Signals.

The sampling unit 163 samples, with a frequency of Fc/2×N that is an integral multiple of a half of the signal symbol rate Fc, the complex digital signal output from the waveform distortion compensator 161. Specifically, the sampling unit 163 calculates the frequency Fc/2×N based on the phase difference indicated by the signal output from the phase difference detector 162 and the preset sampling frequency Fs.

The sampling unit 163 samples the complex digital signal by using the calculated frequency Fc/2×N. The sampling unit 163 performs down-sampling in such a manner that a frequency of the sampled complex digital signal becomes Fc (a sampling rate), and outputs a resultant signal to the demodulator 164. The demodulator 164 demodulates the received signal based on the complex digital signal output from the sampling unit 163. The demodulator 164 compensates, e.g., a phase lag or a frequency drift between the signal light and the local light to demodulate the received signal and outputs data obtained by demodulation to an external destination.

Although a configuration where the optical receiving apparatus 100 includes the local oscillator 110 is explained here, a configuration where the optical receiving apparatus 100 itself does not include the local oscillator 110 may be adopted. For example, the optical receiving apparatus 100 may be connected with an external local oscillator, and the 90° phase hybrid circuit 120 may use local light from the external local oscillator to extract complex electric fields in signal light.

Figure 2:
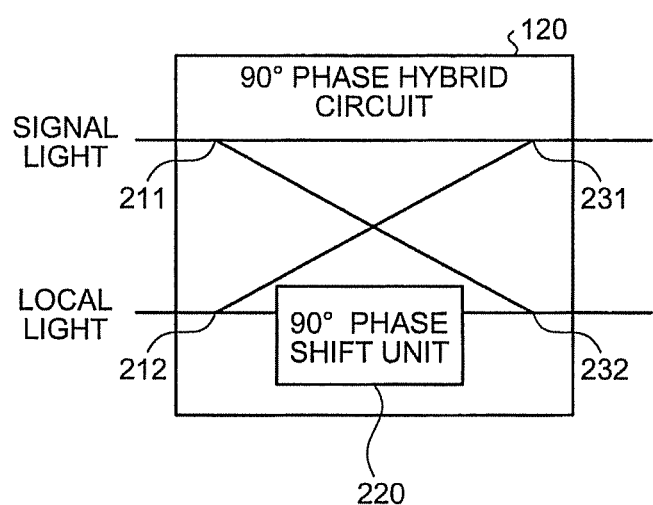
FIG. 2 is a conceptual view of a 90° phase hybrid circuit depicted in FIG. 1.

FIG. 2 is a conceptual view of the 90° phase hybrid circuit depicted in FIG. 1. As depicted in FIG. 2, the 90° phase hybrid circuit 120 includes a branching unit 211, a branching unit 212, a 90° phase shift unit 220, an interference unit 231, and an interference unit 232. The branching unit 211 receives signal light from an external source. The branching unit 211 branches and outputs the received signal light to the interference unit 231 and the interference unit 232, respectively.

The branching unit 212 receives local light from the local oscillator 110. The branching unit 212 branches and outputs the received local light to the interference unit 231 and the 90° phase shift unit 220, respectively. The 90° phase shift unit 220 shifts, by 90°, the phase of the local light output from the branching unit 212 and outputs the phase-shifted local light to the interference unit 232.

The interference unit 231 causes the signal light output from the branching unit 211 and the local light output from the branching unit 212 to interfere with each other. The interference unit 231 outputs, as a signal I to the O/E converter 131, light resulting from interference. The interference unit 232 causes the signal light output from the branching unit 211 and the local light output from the 90° phase shift unit 220 to interfere with each other. The interference unit 232 outputs, as a signal Q to the O/E converter 132, light resulting from interference.

Figure 3:
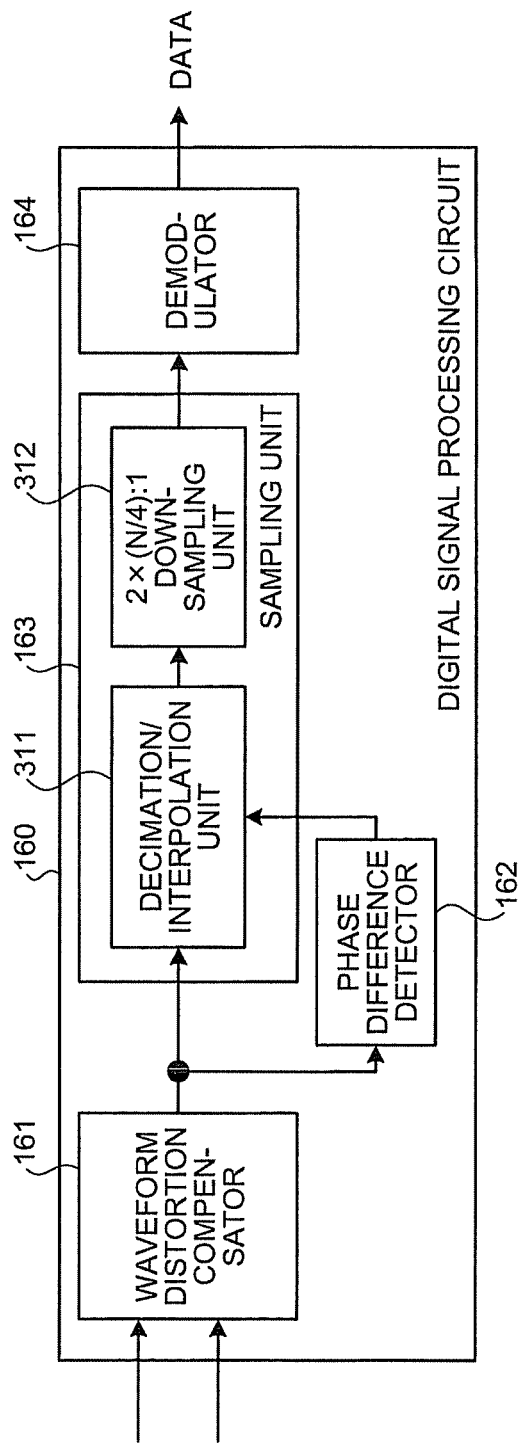
FIG. 3 is a block diagram of an example of a sampling unit depicted in FIG. 1.

FIG. 3 is a block diagram of an example of the sampling unit depicted in FIG. 1. In FIG. 3, components identical to those depicted in FIG. 1 are given identical reference numerals and description thereof is omitted. As depicted in FIG. 3, the sampling unit 163 includes a decimation/interpolation unit 311 and a 2×(N/4):1 down-sampling unit 312. The decimation/interpolation unit 311 thins out signals from the complex digital signal output from the waveform distortion compensator 161 or inserts a signal into the complex digital signal to set a frequency of the complex digital signal to an integral multiple Fc/2×N of a half of the symbol rate Fc of the received signal.

Here, N equals 4. In this case, a clock signal oscillated by the free running sampling trigger source 140 is set to Fc/2×N+α=Fc×2+α. The decimation/interpolation unit 311 sets the complex digital signal having the frequency Fc/2×N+α=Fc×2+α output from the waveform distortion compensator 161 to have a frequency of Fc×2=Fc×2.

The decimation/interpolation unit 311 outputs the complex digital signal set to have the frequency of Fc×2 to the 2×(N/4):1 down-sampling unit 312. The 2×(N/4):1 down-sampling unit 312 performs down-sampling with respect to the complex digital signal output from the decimation/interpolation unit 311 to set the frequency of the complex digital signal to have the symbol rate Fc of the received signal. The 2×(N/4):1 down-sampling unit 312 outputs the complex digital signal subjected to down-sampling to the demodulator 164.

In general, the 2×(N/4):1 down-sampling unit 312 down-samples the frequency of the complex digital signal output from the decimation/interpolation unit 311 to have a symbol rate of a signal. The 2×(N/4):1 down-sampling unit 312 is a circuit that performs down-sampling to provide a symbol rate of a signal. However, when the demodulator has a function of performing down-sampling to provide a symbol rate, the 2×(N/4):1 down-sampling unit 312 may be a circuit that performs down-sampling to provide a symbol rate Fc/2×M (M is an integer).

Figure 4:
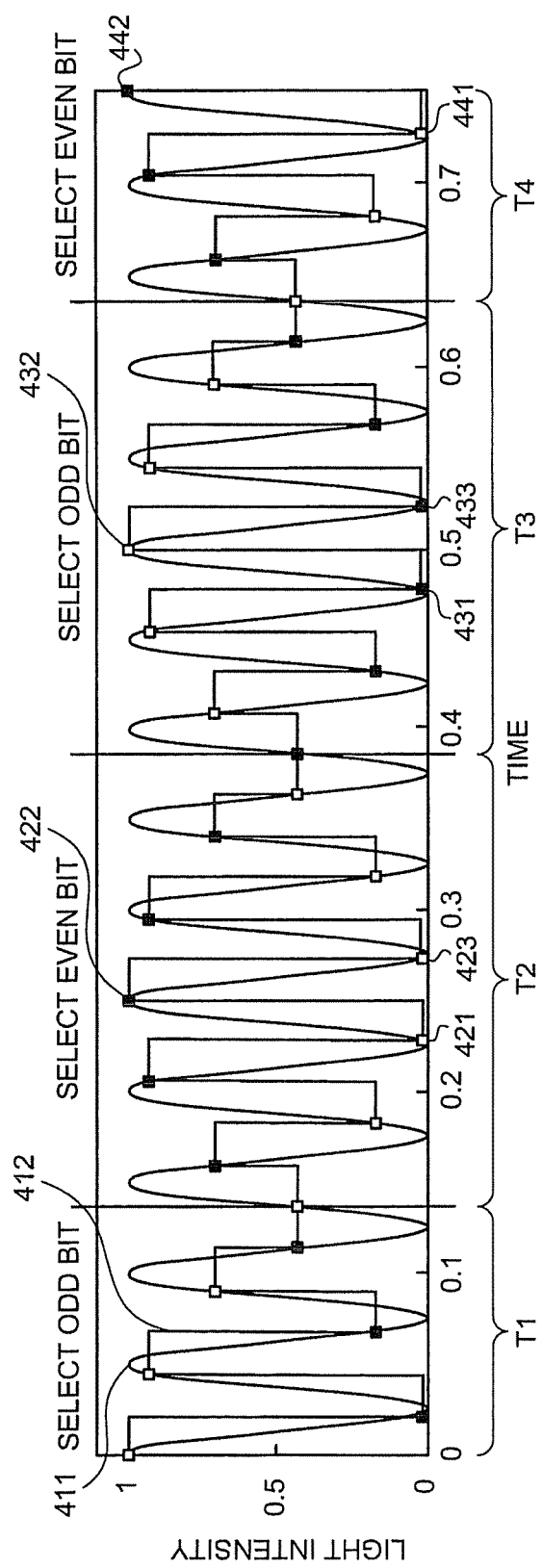
FIG. 4 is a graph of sampling by the sampling unit.

FIG. 4 is a graph of sampling by the sampling unit. In FIG. 4, the abscissa represents time. The ordinate represents light intensity of signal light to be received for ease of explanation. A light intensity can be calculated from the complex digital signal based on signal $I^2$+signal $Q^2$. A waveform 411 represents an intensity waveform of the received signal light before quantization by the ADC. As represented by the waveform 411, the signal light to be received is return-to-zero (RZ)-pulsed signal light in this example. RZ pulsing is provided for ease of explanation, and a non-return-to-zero (NRZ) signal may be also used.

Black and white squares on the waveform 411 represent quantized data sampled by the ADC 151 or the ADC 152. Black squares indicate quantized data of an even bit and white squares indicate quantized data of an odd bit. A waveform 412 represents a complex digital signal output from the ADC 151 or the ADC 152. The waveform 412 is a rectangular wave in which quantized data indicated by black or white squares mark each rising part/falling part.

Assuming that the sampling frequency Fs is double the signal symbol rate Fc, i.e., Fs=Fc×2+α(N=4, α=0), two quantized data items (indicated by black and white squares) are sampled per symbol of the waveform 411.

Here, an example where the sampling frequency Fs is slightly larger than twofold of the signal frequency Fc, i.e., an example where Fs=Fc×2+α(N=4, α>0) is depicted. In this example, since the frequency Fs of the waveform 412 is slightly higher than Fc×2 that is double the frequency of the waveform 411 by α, the phase of the quantized data (indicated by black and white squares) is gradually shifted with respect to the waveform 411.

Therefore, quantized data items 421 to 423 among respective quantized data items are sampled in one symbol of the waveform 411. Quantized data items 431 to 433 and quantized data items 441 to 443 (quantized data item 443 is not depicted) are likewise sampled in one symbol of the waveform 411. In this manner, a state where three quantized data items are sampled in one symbol of the waveform 411 occurs with a frequency corresponding to a difference α between the frequency Fc/2×N and the sampling frequency Fs.

The decimation/interpolation unit 311 thins out quantized data items from the quantized data at the frequency α. A frequency of the complex digital signal (waveform 412) from which quantized data items have been decimated out by the decimation/interpolation unit 311 is Fc×2. The 2×(N/4):1 down-sampling unit 312 takes out either an even bit or an odd bit in the complex digital signal (waveform 412) from which quantized data items have been decimated out by the decimation/interpolation unit 311, thereby performing down-sampling.

Here, as indicated by the black and white squares in the waveform 412, periods T1, T3, . . . where the quantized data (black square) of an even bit is lower than the quantized data (white square) of an odd bit and periods T2, T4, . . . where the quantized data (black square) of an even bit is higher than the quantized data (white square) of an odd bit alternate. The 2×(N/4):1 down-sampling unit 312 samples the quantized data of an odd bit during the periods T1, T3, . . . .

The 2×(N/4):1 down-sampling unit 312 samples the quantized data of an even bit during the periods T2, T4, . . . . As a result, the frequency of the complex digital signal down-sampled by the 2×(N/4):1 down-sampling unit 312 becomes Fc, which is a half of the frequency of the complex digital signal from which quantized data items have been decimated out by the decimation/interpolation unit 311.

Figure 5:
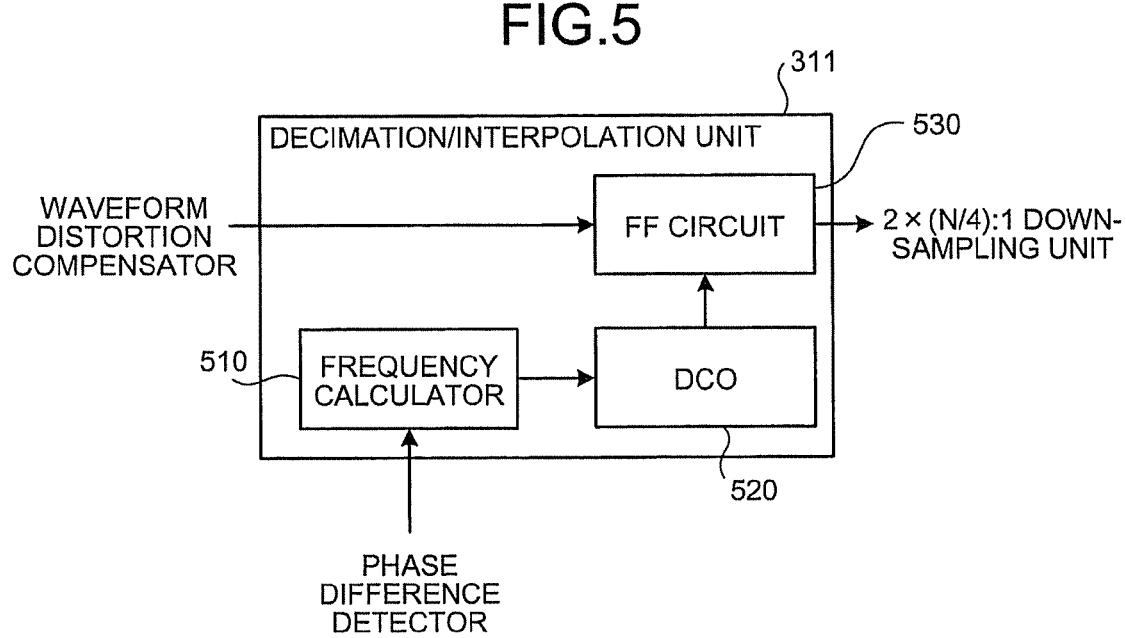
FIG. 5 is a block diagram of a first example of a decimation/interpolation unit depicted in FIG. 3.

FIG. 5 is a block diagram of a first example of the decimation/interpolation unit depicted in FIG. 3. As depicted in FIG. 5, the decimation/interpolation unit 311 includes a frequency calculator 510, a digital control oscillator (DCO) 520, and a FF circuit 530.

The frequency calculator 510 calculates the frequency Fc/2×N that is an integral multiple of a half of the signal frequency Fc based on a variation (derivative) of a phase difference indicated by a signal output from the phase difference detector 162, a Δ phase difference [rad], and the sampling frequency Fs by using, for example, equation 1.

$$Fc/2\times N = Fs\times(1-\Delta \text{ phase difference}/2\pi) \quad (1)$$

The frequency calculator 510 outputs a signal indicative of the calculated frequency Fc/2×N to the DCO 520. The DCO 520 oscillates a clock signal having the frequency Fc/2×N indicated by the signal output from the frequency calculator 510, and outputs the clock signal to the FF circuit 530.

The FF circuit 530 performs retiming with respect to the complex digital signal output from the waveform distortion compensator 161 at the frequency Fc/2×N. Specifically, the FF circuit 530 latches the complex digital signal output from the waveform distortion compensator 161, and outputs the latched complex digital signal to the 2×(N/4):1 down-sampling unit 312 at a timing of the clock signal output from the DCO 520.

Since α>0, data that is to be overwritten without being output from the FF circuit 530 is produced at a frequency α in the complex digital signal having the frequency Fc/2×N+α input from the waveform distortion compensator 161 to the FF circuit 530. Therefore, data is decimated out at the frequency α. When α<0, data that is output twice while being latched by the FF circuit 530 is produced at the frequency α. Therefore, the data is inserted at the frequency α.

Figure 6:
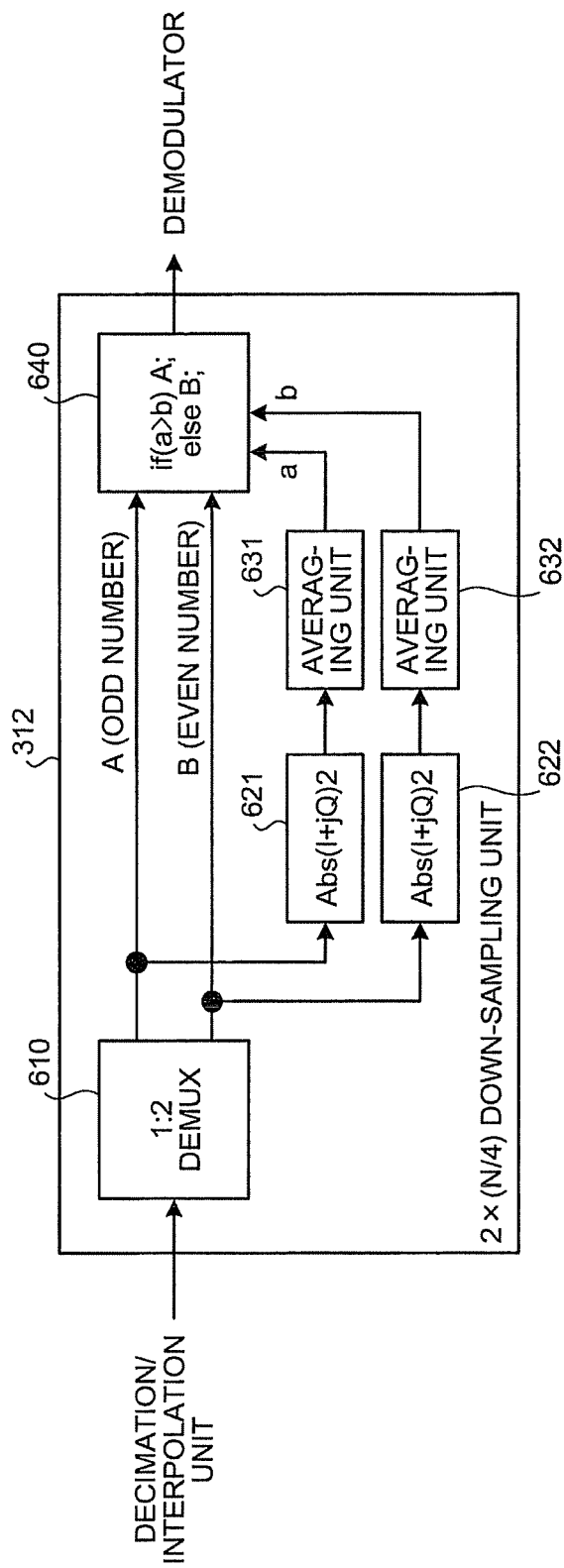
FIG. 6 is a block diagram of a first example of a 2×(N/4):1 down-sampling unit depicted in FIG. 3.

FIG. 6 is a block diagram of a first example of the 2×(N/4):1 down-sampling unit depicted in FIG. 3. An example where N=4, i.e., where 2:1 down-sampling is performed will be explained. As depicted in FIG. 6, the 2×(N/4):1 down-sampling unit 312 includes a 1:2 demultiplexer (1:2 DEMUX) 610, an intensity calculator (Abs(I+jQ)2) 621, an intensity calculator 622, an averaging unit 631, an averaging unit 632, and a selector 640. The 1:2 demultiplexer 610 performs time-demultiplexing with respect to the complex digital signal output from the decimation/interpolation unit 311 to obtain a complex digital signal having a signal symbol rate Fc.

Specifically, the 1:2 demultiplexer 610 outputs to the selector 640 and the intensity calculator 621, quantized data A of an odd bit in the complex digital signal output from the decimation/interpolation unit 311. The 1:2 demultiplexer 610 further outputs to the selector 640 and the intensity calculator 622, quantized data B of an even bit in the complex digital signal output from the decimation/interpolation unit 311.

The intensity calculator 621 calculates a square of an absolute value of the quantized data (I.jQ) of an odd bit output from the 1:2 demultiplexer 610 as an intensity. The intensity calculator 621 outputs a calculated value to the averaging unit 631. The intensity calculator 622 calculates a square of an absolute value of the quantized data (I.jQ) of an even bit output from the 1:2 demultiplexer 610 as an intensity. The intensity calculator 622 outputs a calculated value to the averaging unit 632.

The averaging unit 631 outputs to the selector 640, an average value a (time average) of values output from the intensity calculator 621. The averaging unit 632 outputs to the selector 640, an average value b (time average) of values output from the intensity calculator 622. The selector 640 selects either the quantized data A of an odd bit or the quantized data B of an even bit output from the 1:2 demultiplexer 610, and outputs the selected data to the demodulator 164.

Specifically, when the average value a from the averaging unit 631 is larger than the average value b from the averaging unit 632, the selector 640 selects and outputs the quantized data A of an odd bit. When the average value a from the averaging unit 631 is equal to or smaller than the average value b from the averaging unit 632, the selector 640 selects and outputs the quantized data B of an even bit.

As a result, as depicted in FIG. 4, the 2×(N/4):1 down-sampling unit 312 can sample quantized data as data indicated by white squares during the periods T1, T3, . . . and sample quantized data as data indicated by black squares during the periods T2, T4, . . . . Consequently, the one having a higher intensity can be always selected and sampled from among the quantized data of an odd bit and the quantized data of an even bit. Therefore, a signal noise (SN) ratio of a complex digital signal output to the demodulator 164 can be improved.

Figure 7:
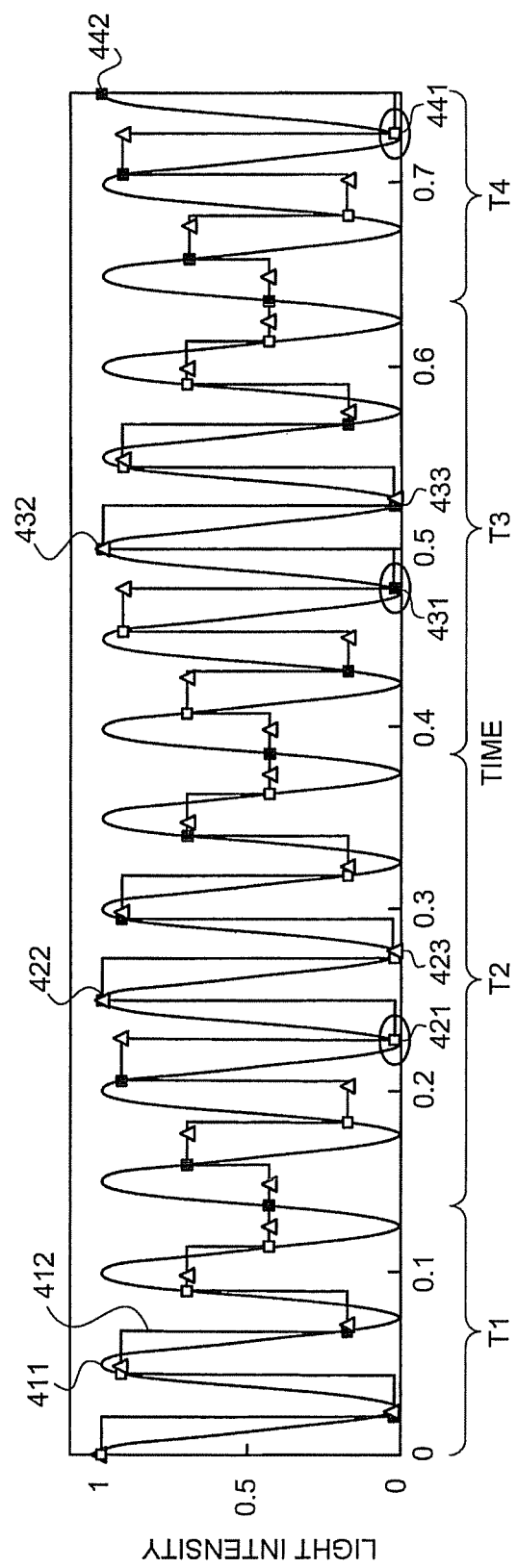
FIG. 7 is a graph of retiming performed by a flip-flop (FF) circuit depicted in FIG. 5.

FIG. 7 is a graph of retiming performed by the FF circuit depicted in FIG. 5. In FIG. 7, components identical to those depicted in FIG. 4 are given identical reference numerals and description thereof is omitted. A triangle on the waveform 412 indicates data that is subjected to retiming by the FF circuit 530 and output from the FF circuit 530. Data indicated by a triangle corresponds to each quantized data item excluding quantized data items 422, 432, and 442 among the respective quantized data items indicated by the black and white squares.

Conversely, data corresponding to the quantized data items 422, 432, and 442 is not output from the FF circuit 530. That is, it can be understood that the quantized data items 421, 431, and 441 are decimated out respectively from among the three pieces of quantized data items sampled per symbol of the waveform 411, i.e., from among the quantized data items 421 to 423, the quantized data items 431 to 433, and the quantized data items 441 to 443 (quantized data item 443 is not depicted).

Figure 8:
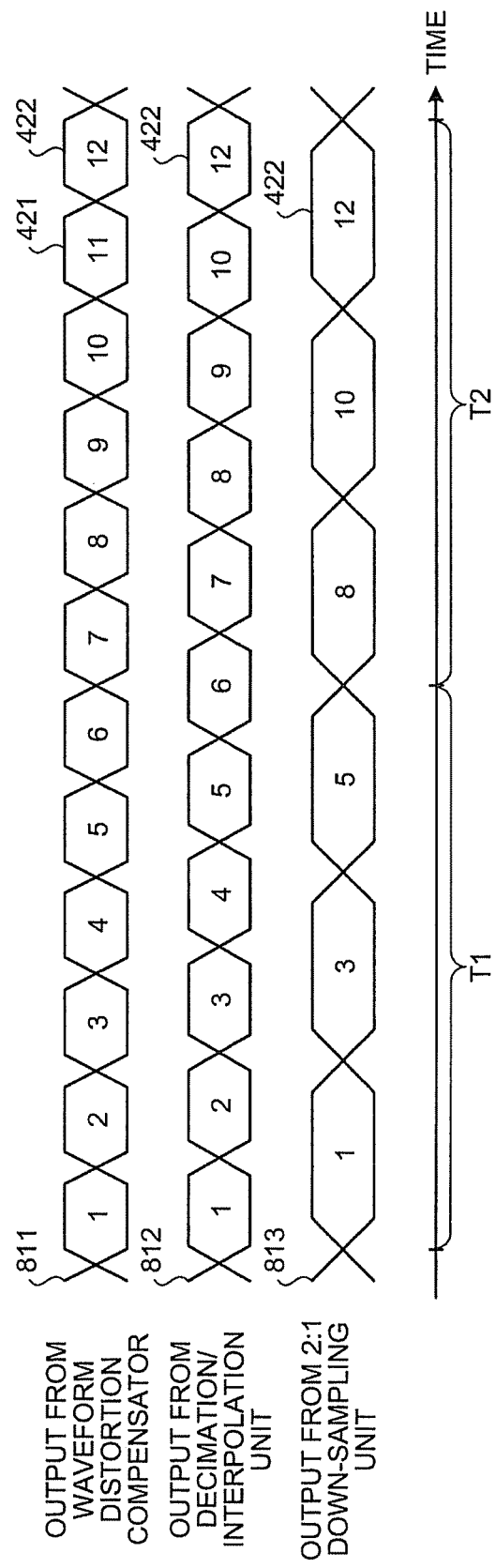
FIG. 8 is a diagram of output from respective units in the digital signal processing circuit.

FIG. 8 is a diagram of output from respective units in the digital signal processing circuit. In FIG. 8, components identical to those depicted in FIG. 4 are given identical reference numerals and description thereof is omitted. A digital signal 811 represents a complex digital signal output from the waveform distortion compensator 161. Data items denoted by reference numerals 1 to 12 in the digital signal 811 are respective quantized data items. For example, respective quantized data items denoted by reference numerals 10 to 12 correspond to the quantized data items 421 to 423 depicted in FIG. 4. A frequency of the digital signal 811 is 2×Fc+α(α>0).

A digital signal 812 represents a complex digital signal output from the decimation/interpolation unit 311. Since the decimation/interpolation unit 311 thins out data from the digital signal 811 at a frequency α, a frequency of the digital signal 812 is 2×Fc. In this example, data designated by reference numeral 11 (quantized data item 422 in FIG. 4) is decimated out in the digital signal 811.

A digital signal 813 represents a complex digital signal output from the 2×(N/4):1 down-sampling unit 312. The 2×(N/4):1 down-sampling unit 312 sets the frequency of the digital signal 813 to a symbol rate Fc. The digital signal 813 is a signal obtained by sampling data of an odd bit (reference numeral 1, 3, or 5) during the period T1 and by sampling data of an even bit (reference numeral 8, 10, or 12) during the period T2.

Figure 9:
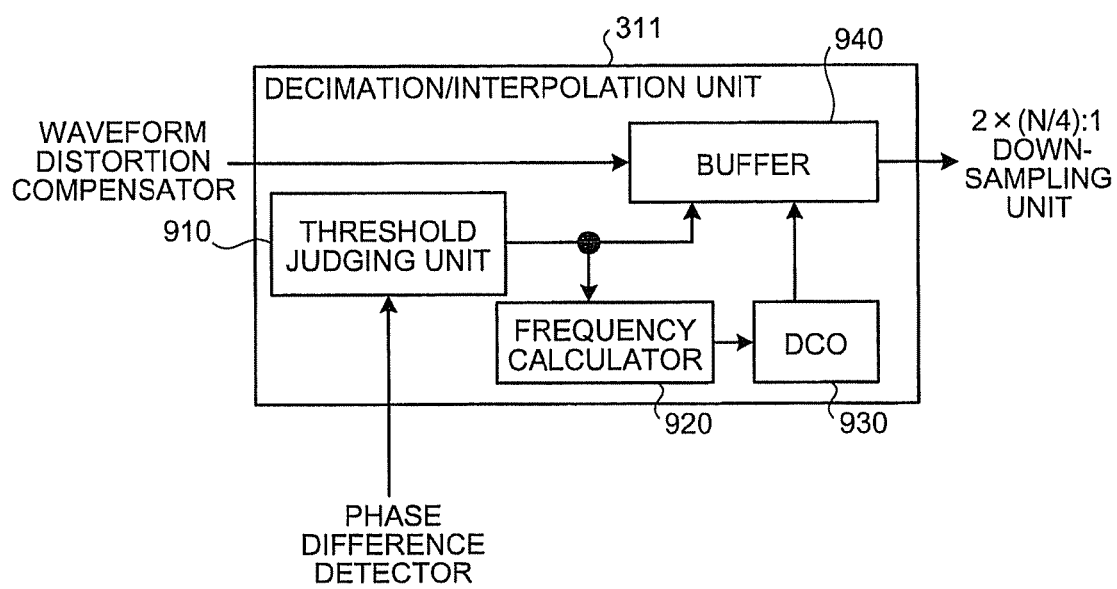
FIG. 9 is a block diagram of a second example of the decimation/interpolation unit depicted in FIG. 3.

FIG. 9 is a block diagram of a second example of the decimation/interpolation unit depicted in FIG. 3. As depicted in FIG. 9, the decimation/interpolation unit 311 may include a threshold judging unit 910, a frequency calculator 920, a DCO 930, and a buffer 940. The threshold judging unit 910 integrates a phase difference indicated by a signal output from the phase difference detector 162.

When an integrated value exceeds a predetermined threshold, the threshold judging unit 910 outputs a signal indicative of this fact to the frequency calculator 920 and the buffer 940. When the threshold judging unit 910 outputs the signal indicating that the integrated value exceeds the predetermined threshold, the threshold judging unit 910 resets the integrated value.

A frequency of the signal output from the threshold judging unit 910 becomes the difference α between a frequency Fc/2×N that is an integral multiple of a half of the signal frequency Fc and the sampling frequency Fs. The frequency calculator 920 calculates the frequency Fc/2×N that is an integral multiple of a half of the signal frequency Fc based on the frequency α of the signal output from the threshold judging unit 910 and the sampling frequency Fs. Specifically, the frequency calculator 920 calculates Fs-α to obtain Fc/2×N.

The frequency calculator 920 outputs a signal indicative of the obtained frequency Fc/2×N to the DCO 930. The DCO 930 oscillates a clock signal having the frequency Fc/2×N indicated by the signal output from the frequency calculator 920, and outputs the clock signal to the buffer 940. The buffer 940 stores a complex digital signal output from the waveform distortion compensator 161.

The buffer 940 outputs stored data, item by item, to the 2×(N/4):1 down-sampling unit 312 at a timing of the clock signal output from the DCO 930. The buffer 940 is a first-in first-out (FIFO) type buffer that outputs data in the order that the data has been stored.

When a signal indicating that the integrated value exceeds the predetermined threshold is output from the threshold judging unit 910, the buffer 940 erases one stored data item. As a result, data can be decimated out at the frequency α from the complex digital signal having the frequency Fc/2×N+α. For example, the buffer 940 erases data in the order that the data has been stored.

Figure 10:
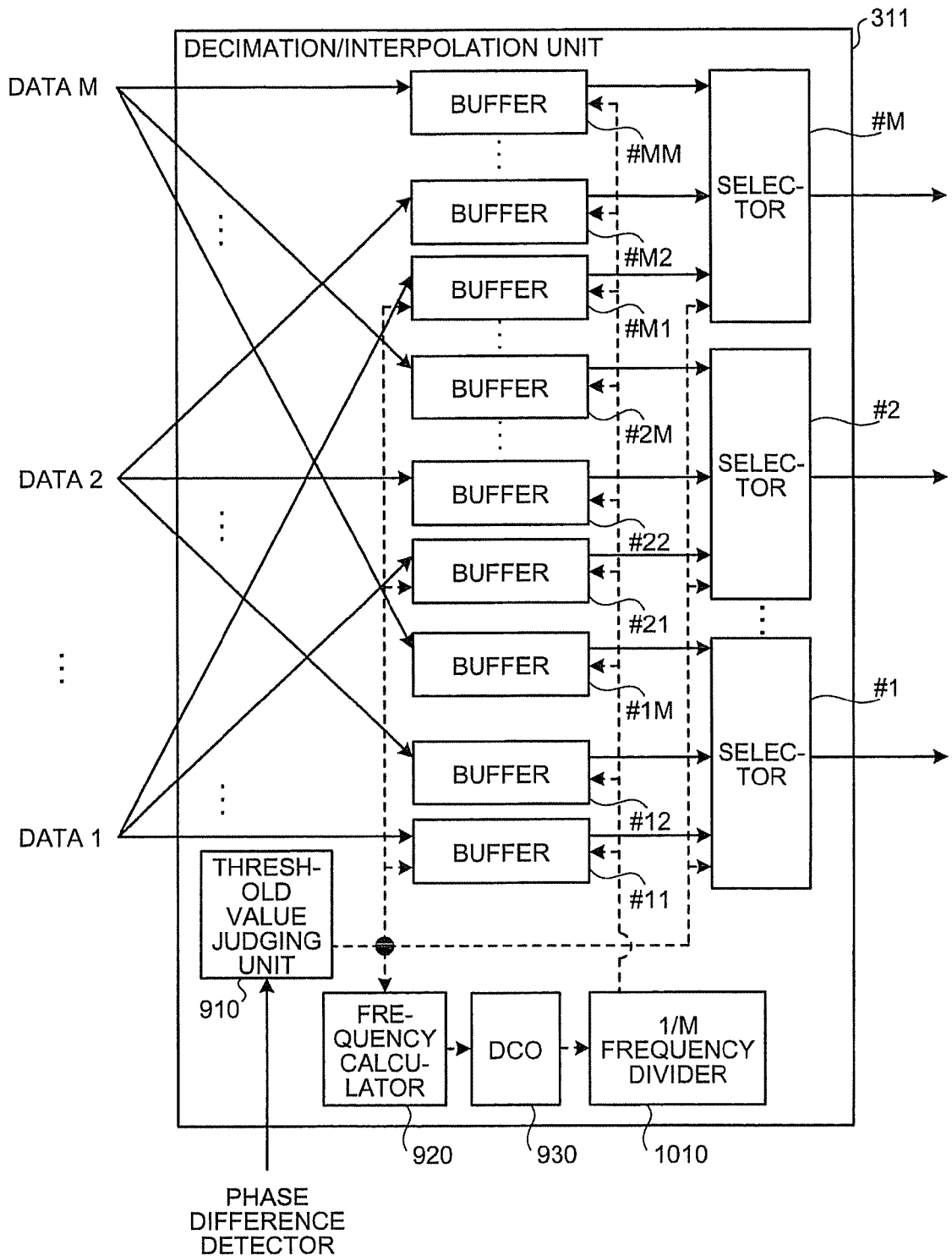
FIG. 10 is a block diagram of a modification of the decimation/interpolation unit depicted in FIG. 9.

FIG. 10 is a block diagram of a modification of the decimation/interpolation unit depicted in FIG. 9. In FIG. 10, components identical to those depicted in FIG. 9 are given identical reference numerals and description thereof is omitted. In this example, a structure where M complex digital signals (M=2, 3, 4, . . . ) are aligned in parallel on an upstream side of the decimation/interpolation unit 311 and data is decimated out or inserted while performing parallel processing with respect to the M complex digital signals by the decimation/interpolation unit 311 will be explained.

In this example, as depicted in FIG. 10, the decimation/interpolation unit 311 includes the threshold judging unit 910, the frequency calculator 920, the DCO 930, a 1/M frequency divider 1010, M×M buffers #11, #12, #1M, #21, #22, . . . , #2M, . . . , #M1, #M2, . . . , and #MM, and M selectors #1 to #M. In FIG. 10, respective outputs from the threshold judging unit 910, the frequency calculator 920, the DCO 930, and the 1/M frequency divider 1010 are indicated by dotted arrows.

It is assumed that the M complex digital signals input to the decimation/interpolation unit 311 are data items 1, 2, . . . , M. Frequencies of the data items 1, 2, . . . , M are Fc/M that is 1/M of the signal frequency Fc. The data item 1 is stored in the buffers #11, #21, . . . , #M1, respectively. The data item 2 is stored in the buffers #12, #22, . . . , #M2, respectively. In general, the data item M is stored in the buffers #1M, #2M, . . . , #MM, respectively.

The threshold judging unit 910 outputs the signal indicating that the integrated value exceeds the predetermined threshold to each of the frequency calculator 920, the buffers #11, #21, . . . , and #M1, and the selectors #1, #2, . . . , #M. The DCO 930 oscillates a clock signal having the frequency Fc/2×N indicated by the signal output from the frequency calculator 920, and outputs this clock signal to the 1/M frequency divider 1010.

The 1/M frequency divider 1010 divides a frequency of the clock signal output from the DCO 930 into 1/M, and outputs a resultant frequency to the buffers #11, #12, #1M, #21, #22, . . . , #2M, . . . , #M1, #M2, . . . , #MM, respectively. This example can likewise adopt a configuration where the frequency calculator 920 calculates a frequency Fc/2×N/M; the DCO oscillates a clock signal having the frequency Fc/2×N/M; and the 1/M frequency divider 1010 is not provided.

The buffers #11, #12, . . . , #1M respectively output stored data, item by item, to the selector #1 at a timing of the clock signal from the 1/M frequency divider 1010. The buffers #21, #22, . . . , #2M respectively output stored data, item by item, to the selector #2 at the timing of the clock signal from the 1/M frequency divider 1010.

In general, the buffers #M1, #M2, . . . , #MM respectively output stored data, item by item, to the selector #M at the timing of the clock signal from the 1/M frequency divider 1010. When a signal indicating that the integrated value exceeds the predetermined threshold is output from the threshold judging unit 910, the buffers #11, #21, . . . , #M1 respectively erase one stored data item.

The selectors #1 to #M output data items 1 to M in an initial state, respectively. That is, the selector #1 outputs to the 2×(N/4):1 down-sampling unit 312 data output from the buffer #11. The selector #2 outputs to the 2×(N/4):1 down-sampling unit 312 data output from the buffer #22. In general, the selector #M outputs to the 2×(N/4):1 down-sampling unit 312 data output from the buffer #MM.

When a signal indicating that the integrated value exceeds the predetermined threshold is output from the threshold judging unit 910, the selectors #1 to #M shift lanes for data to be output item by item. That is, the selector #1 outputs data output from the buffer #12, and the selector #2 outputs data output from the buffer #23. In general, the selector #M outputs to 2×(N/4):1 down-sampling unit 312 data output from the buffer #M1.

As a result, the data item 1 is decimated out, output lanes are thereby shifted, and the data items 2 to M are output from the selectors #1 to #M-1, respectively. The selector #1 outputs the next data 1 stored in the buffer #11. Although a configuration where the data item 1 is always decimated out is explained here, the data to be decimated out is not restricted to the data item 1.

For example, when decimating out the data item M, the threshold judging unit 910 outputs a signal indicating that the integrated value exceeds the predetermined threshold to each of the buffers #1M, #2M, . . . , #MM. When the signal indicating that the integrated value exceeds the predetermined threshold is output from the threshold judging unit 910, the buffers #1M, #2M, . . . , #MM respectively erase one stored data item.

Figure 11:
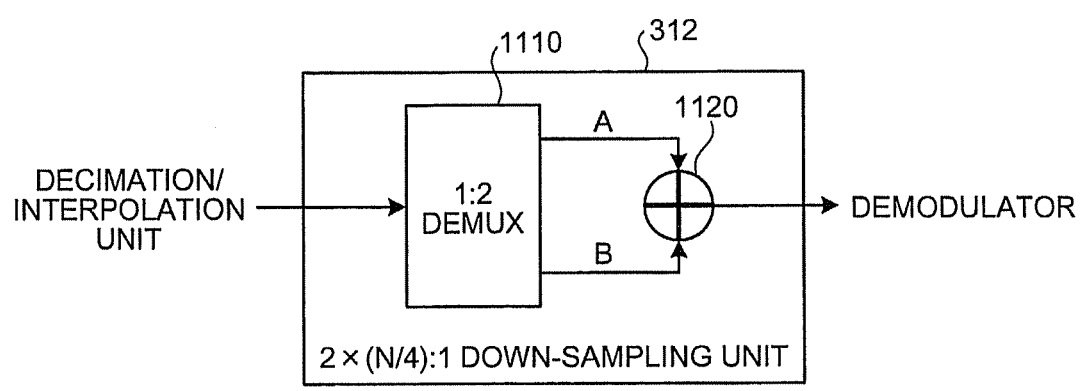
FIG. 11 is a block diagram of a second example of the 2×(N/4):1 down-sampling unit 312 depicted in FIG. 3.

FIG. 11 is a block diagram of a second example of the 2×(N/4):1 down-sampling unit 312 depicted in FIG. 3. An example where N=4, i.e., where 2:1 down-sampling is performed will be explained. As depicted in FIG. 11, the 2×(N/4):1 down-sampling unit 312 may include a 1:2 demultiplexer 1110 and an adder 1120. The 1:2 demultiplexer 1110 performs time-demultiplexing with respect to a complex digital signal output from the decimation/interpolation unit 311.

Specifically, the 1:2 demultiplexer 1110 outputs to the adder 1120, quantized data A of an odd bit in a complex digital signal output from the decimation/interpolation unit 311. The 1:2 demultiplexer 1110 outputs to the adder 1120, quantized data B of an even bit in the complex digital signal output from the decimation/interpolation unit 311.

The adder 1120 adds a complex digital signal A (quantized data of an odd bit) output from the 1:2 demultiplexer 1110 to a complex digital signal B (quantized data of an even bit) output from the 1:2 demultiplexer 1110. The adder 1120 outputs a complex digital signal indicative of an addition result to the demodulator 164.

Figure 12:
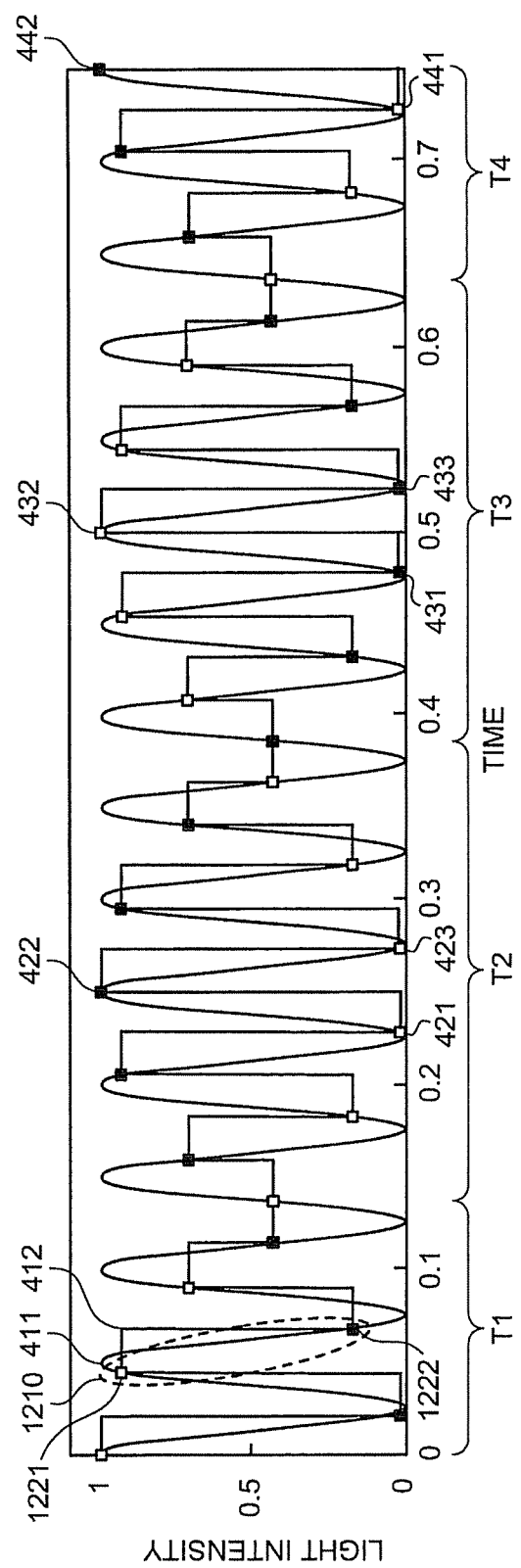
FIG. 12 is a graph of down-sampling performed by the 2×(N/4):1 down-sampling unit depicted in FIG. 11.

FIG. 12 is a graph of down-sampling performed by the 2×(N/4):1 down-sampling unit depicted in FIG. 11. In FIG. 12, components identical to those depicted in FIG. 4 are given identical reference numerals and description thereof is omitted. The 2×(N/4):1 down-sampling unit 312 depicted in FIG. 11 outputs to the demodulator 164, for example, a complex digital signal indicative of a result of adding quantized data 1221 and quantized data 1222 surrounded by a dotted line 1210 in FIG. 12.

As explained, in the 2×(N/4):1 down-sampling unit 312, a digital signal obtained after down-sampling becomes a result of adding quantized data of an odd bit and quantized data of an even bit that are continuous. As a result, an SN ratio of a complex digital signal when sampling quantized data having a low light intensity can be improved at the time of down-sampling.

Figure 13:
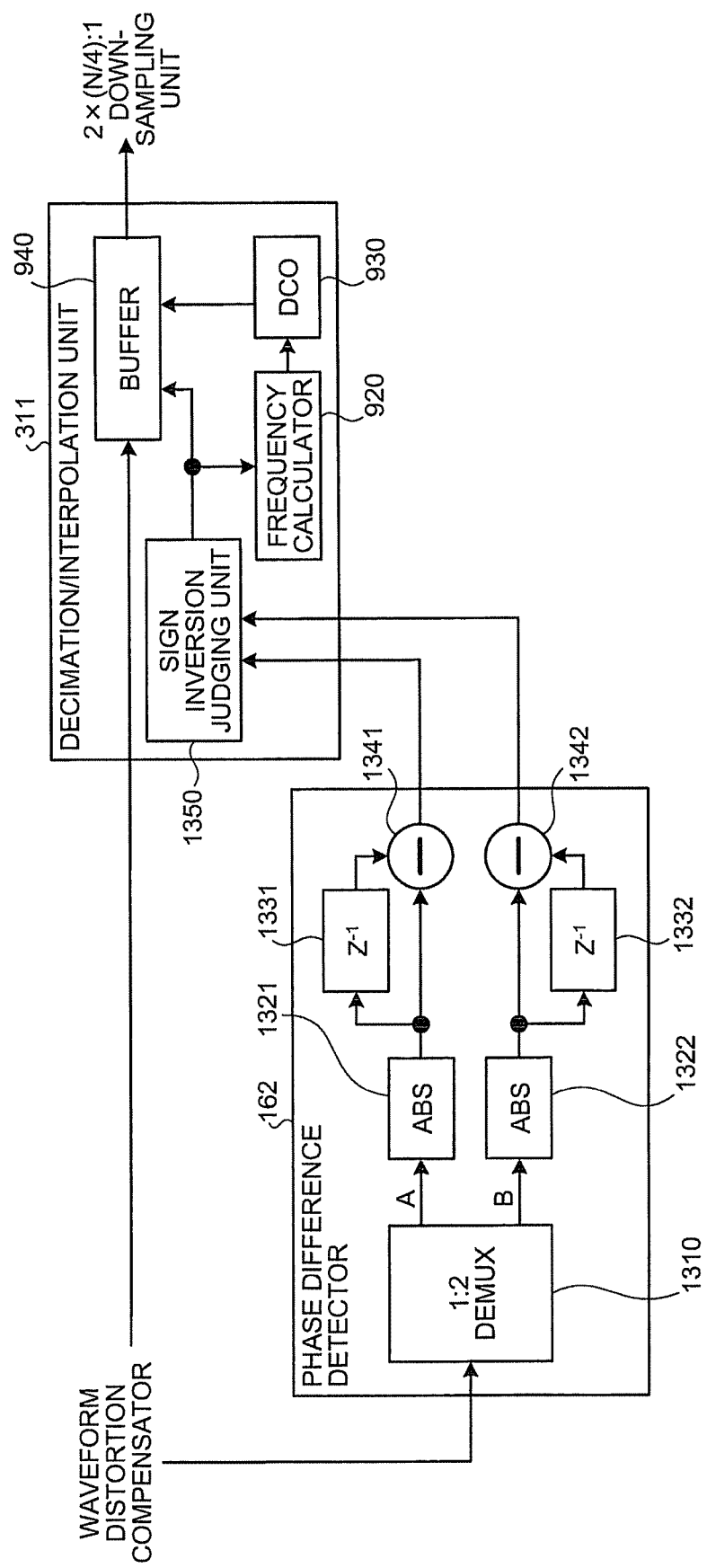
FIG. 13 is a block diagram of a third example of the decimation/interpolation unit depicted in FIG. 3.

FIG. 13 is a block diagram of a third example of the decimation/interpolation unit depicted in FIG. 3. The third example of the decimation/interpolation unit 311 and the phase difference detector 162 with respect to the third example will be explained here. The phase difference detector 162 includes a 1:2 demultiplexer 1310, an absolute value calculating unit 1321, an absolute value calculating unit 1322, a one-bit delay circuit 1331, a one-bit delay circuit 1332, a subtracting circuit 1341, and a subtracting circuit 1342.

The 1:2 demultiplexer unit (1:2 DEMUX) 1310 performs time-demultiplexing with respect to a complex digital signal output from the waveform distortion compensator 161 to obtain a complex digital signal having a signal frequency Fc. Specifically, the 1:2 demultiplexer 1310 outputs to the absolute value calculating unit 1321, quantized data A of an odd bit in the complex digital signal output from the waveform distortion compensator 161.

Further, the 1:2 demultiplexer 1310 outputs to the absolute value calculating unit 1322, quantized data B of an even bit in the complex digital signal output from the waveform distortion compensator 161. The absolute value calculating unit 1321, the absolute value calculating unit 1322, the one-bit delay circuit 1331, the one-bit delay circuit 1332, the subtracting circuit 1341, and the subtracting circuit 1342 form a differential calculating unit that calculates a derivative of the complex digital signal subjected to time-demultiplexing by the 1:2 demultiplexer 1310.

The absolute value calculating (ABS) unit 1321 calculates an absolute value of a complex signal including a signal I and a signal Q of the complex digital signal output from the 1:2 demultiplexer 1310, and outputs a signal indicative of the calculated absolute value to the one-bit delay circuit 1331 and the subtracting circuit 1341, respectively. The absolute value calculating unit 1322 calculates an absolute value of a complex signal including a signal I and a signal Q of the complex digital signal output from the 1:2 demultiplexer 1310, and outputs a signal indicative of the calculated absolute value to the one-bit delay circuit 1332 and the subtracting circuit 1342, respectively.

The one-bit delay circuit ($Z^{-1}$) 1331 delays the signal output from the absolute value calculating unit 1321 by one bit, and outputs the delayed signal to the subtracting circuit 1341. The one-bit delay circuit 1332 delays the signal output from the absolute value calculating unit 1322 by one bit, and outputs the delayed signal to the subtracting circuit 1342.

The subtracting circuit 1341 performs subtraction with respect to the signal output from the absolute value calculating unit 1321 and the signal output from the one-bit delay circuit 1331. The subtracting circuit 1341 outputs a signal indicative of a subtraction result to the decimation/interpolation unit 311. The subtracting circuit 1342 performs subtraction with respect to the signal output from the absolute value calculating unit 1322 and the signal output from the one-bit delay circuit 1332. The subtracting circuit 1342 outputs a signal indicative of the subtraction result to the decimation/interpolation unit 311.

The signal output from the subtracting circuit 1341 is indicative of a derivative of an odd bit in a complex digital signal. The derivative indicative of the odd bit in the complex digital signal is equivalent to a phase difference between a sampling clock and the odd bit in the complex digital signal. The signal output from the subtracting circuit 1342 is indicative of a derivative of an even bit in a complex digital signal. A derivative of an even bit in the complex digital signal is equivalent to a phase difference between the sampling clock and the even bit in the complex digital signal.

The decimation/interpolation unit 311 includes a sign inversion judging unit 1350, the frequency calculator 920, the DCO 930, and the buffer 940. When a sign of either the derivative from the subtracting circuit 1341 or the derivative from the subtracting circuit 1342 is changed from a negative sign to a positive sign, the sign inversion judging unit 1350 outputs a signal indicative of the change to the frequency calculator 920 and the buffer 940.

A frequency of the signal output from the sign inversion judging unit 1350 corresponds to a difference between the frequency Fc×N that is an integral multiple of the signal frequency Fc and the sampling frequency Fs. The frequency calculator 920 calculates the frequency Fc×N that is an integral multiple of the signal frequency Fc based on the signal output from the sign inversion judging unit 1350 and the frequency of the sampling clock.

When a signal indicative of a change of the derivative from a negative value to a positive value is output from the sign inversion judging unit 1350, the buffer 940 erases one data item stored in the buffer 940. Data can be decimated out at the frequency $\alpha$ from a complex digital signal having a frequency of Fc/2×N+$\alpha$. For example, as indicated by black and white squares in FIG. 4, quantized data having a derivative (variation with respect to previous quantized data) changed from a negative value to a positive value among respective quantized data items is quantized data having a low light intensity.

Therefore, when the buffer 940 erases data stored therein each time a signal indicative of a change of a derivative from a negative value to a positive value is output from the sign inversion judging unit 1350, quantized data having a low light intensity among respective of quantized data items can be decimated out. Therefore, an SN ratio of a complex digital signal that is output to the demodulator 164 can be improved.

Figure 14:
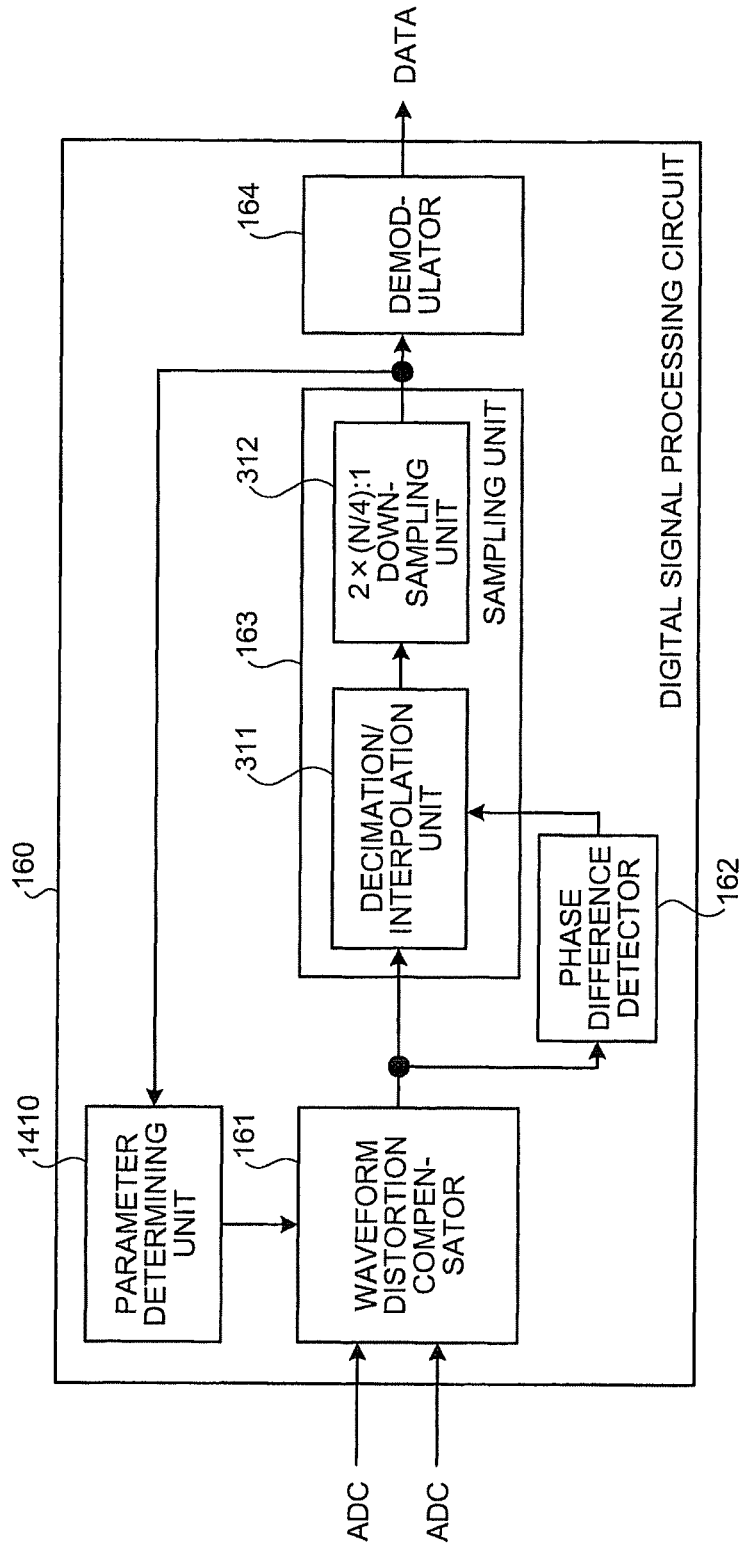
FIG. 14 is a block diagram of a modification of the digital signal processing circuit depicted in FIG. 3.

FIG. 14 is a block diagram of a modification of the digital signal processing circuit depicted in FIG. 3. In FIG. 14, components identical to those depicted in FIG. 3 are given identical reference numerals and description thereof is omitted. As depicted in FIG. 14, the digital signal processing circuit 160 may include a parameter determining unit 1410 in addition to the components depicted in FIG. 3. The sampling unit 163 outputs a sampled complex digital signal to the demodulator 164 and the parameter determining unit 1410.

The parameter determining unit 1410 determines a compensation parameter for the waveform distortion compensator 161 based on the complex digital signal output from the sampling unit 163. For example, when performing finite impulse response (FIR) filtering for dispersion compensation at the waveform distortion compensator 161, the parameter determining unit 1410 determines a tap coefficient for the FIR filtering as a compensation parameter.

For example, a constant modulus algorithm (CMA) can be used to determine a tap coefficient. The parameter determining unit 1410 outputs the determined compensation parameter to the waveform distortion compensator 161. The waveform distortion compensator 161 uses the compensation parameter output from the parameter determining unit 1410 to perform waveform distortion compensation. As a result, waveform distortion compensation at the waveform distortion compensator 161 can be accurately performed.

Figure 15:
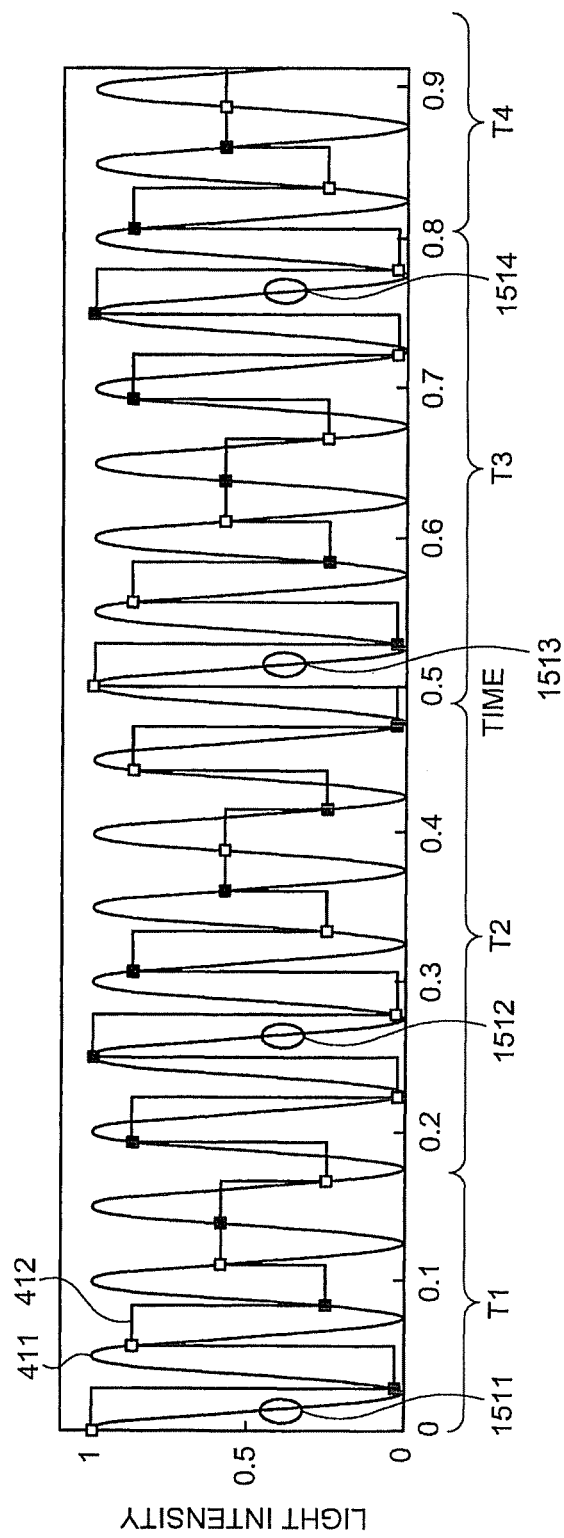
FIG. 15 is another graph of sampling performed by the sampling unit.

FIG. 15 is another graph of sampling performed by the sampling unit. In FIG. 15, components identical to those depicted in FIG. 4 are given identical reference numerals and description thereof is omitted. Although the example where $\alpha>0$ is explained above, FIG. 15 depicts an example where $\alpha<0$, i.e., where a frequency of a sampling clock output from the free running sampling trigger source 140 is smaller than an integral multiple of a half of a signal frequency Fc.

When $\alpha>0$, a symbol allowing only one quantized data item to be sampled appears at the frequency $\alpha$. In this case, the decimation/interpolation unit 311 inserts data from the digital signal 811 at the frequency $\alpha$. For example, the decimation/interpolation unit 311 inserts data at positions denoted by reference numerals 1511, 1512, 1513, and 1514 in the waveform 411. As a result, a frequency of the digital signal 812 becomes Fc/2×N. Data to be inserted may be 0 or 1, or may be a copy of the preceding bit.

Figure 16:
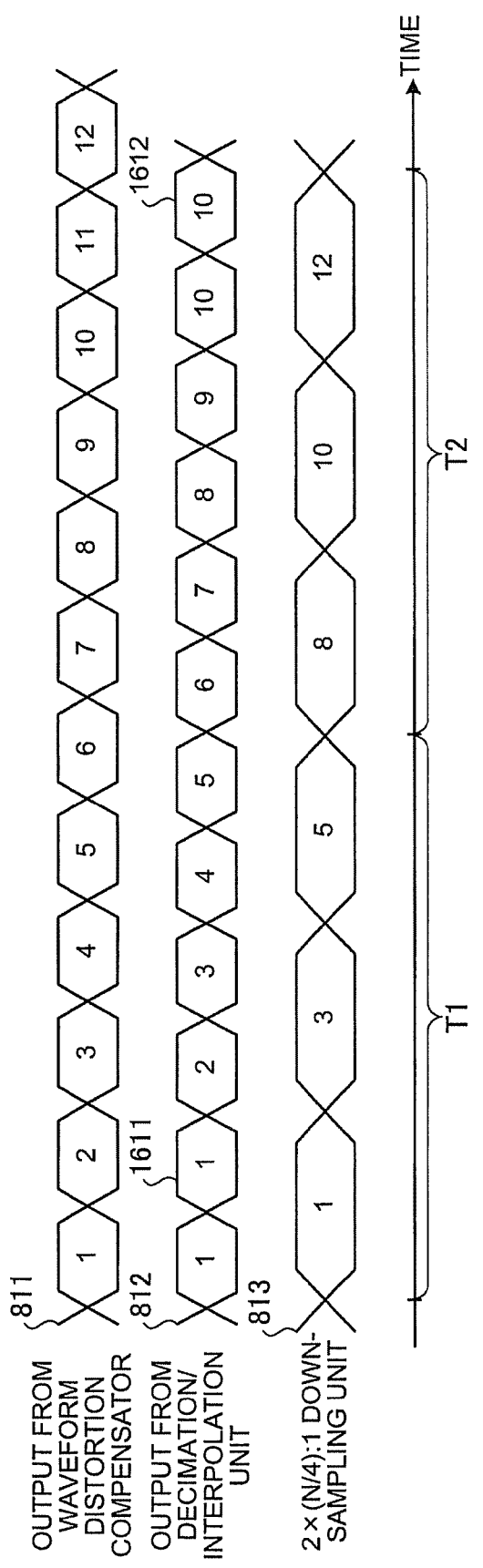
FIG. 16 is another diagram of output from respective units in the digital signal processing circuit.

FIG. 16 is another diagram of output from respective units in the digital signal processing circuit. In FIG. 16, components identical to those depicted in FIG. 8 are given identical reference numerals and description thereof is omitted. The frequency of the digital signal 811 is Fc/2×N+$\alpha$($\alpha<0$). Since the decimation/interpolation unit 311 inserts data with respect to the digital signal 811 at the frequency $\alpha$, the frequency of the digital signal 812 becomes Fc/2×N, which is an integral multiple of a half of a signal frequency.

In this example, a copy 1611 of data denoted by reference numeral 1 is inserted between the data designated by reference numeral 1 and data designated by reference numeral 2 in the digital signal 812. The copy 1611 is data inserted at the position designated by reference numeral 1511 in FIG. 15. A copy 1612 of data denoted by reference numeral 10 is inserted immediately after the data designated by reference numeral 10. The copy 1612 is data inserted at the position denoted by reference numeral 1512 in FIG. 15.

When the difference $\alpha$ between Fc/2×N that is an integral multiple of a half of the signal frequency and the sampling frequency Fs is too small with respect to the signal frequency Fc, the effect of $\alpha$ becomes too great in the waveform distortion compensation at the waveform distortion compensator 161, and a result of waveform distortion compensation does not converge to an optimum value. Therefore, it is desirable for the sampling frequency Fs to be lower than Fc/2×N that is an integral multiple of a half of the signal frequency. That is, $\alpha>0$ is desirable.

When a frequency (baud rate) of signal light is 10 gigahertz, setting $\alpha$=approximately 10 megahertz (1/1000 of the baud rate) prevents erroneous operation of the waveform distortion compensator 161. Setting $\alpha$=100 megahertz (1/100 of the baud rate) or above enables hastening of the convergence to an optimum value at the waveform distortion compensator 161.

As explained, according to the optical receiving apparatus 100 of the first embodiment, use of a free running clock signal enables stable digital conversion irrespective of a waveform distortion state of signal light. When a digital-converted complex digital signal is again sampled at a frequency that is an integral multiple of a signal frequency Fc, the frequency of the complex digital signal for demodulation can be set to a signal symbol rate Fc even though there is a difference $\alpha$ between the signal symbol rate Fc and the sampling frequency Fs.

Calculation of the signal frequency Fc with respect to the complex digital signal subjected to waveform distortion compensation enables a highly accurate signal symbol rate Fc to be obtained even though the waveform of signal light is distorted. Since the free running clock signal is used, a recovered clock from a downstream side of the ADCs 151 and 152 does not have to be looped, thereby preventing sampling delay in the ADCs 151 and 152.

Thus, errors in demodulation can be reduced, and reception characteristics can be improved. Since the free running clock is used, the ADCs 151 and 152 that perform digital conversion and the digital signal processing circuit 160 can have configuration independent from each other. Therefore, design and performance guarantee of the ADCs 151 and 152 and the digital signal processing circuit 160 can be achieved, thereby improving reception characteristics and reducing cost.

Since the ADCs 151 and 152 and the digital signal processing circuit 160 have independent configurations, merely enabling changing of the frequency Fs of the clock signal oscillated by the free running sampling trigger source 140 can cope with multi rate of signal light. Addition of functions to the digital signal processing circuit 160 or replacement of the ADCs 151 and 152 can be facilitated, thereby improving expandability.

Since reception characteristics can be improved without performing complicated operations, e.g., SINC interpolation at the digital signal processing circuit 160, circuit scale can be reduced, and signal light having an optical bit rate can be received accurately.

Figure 17:
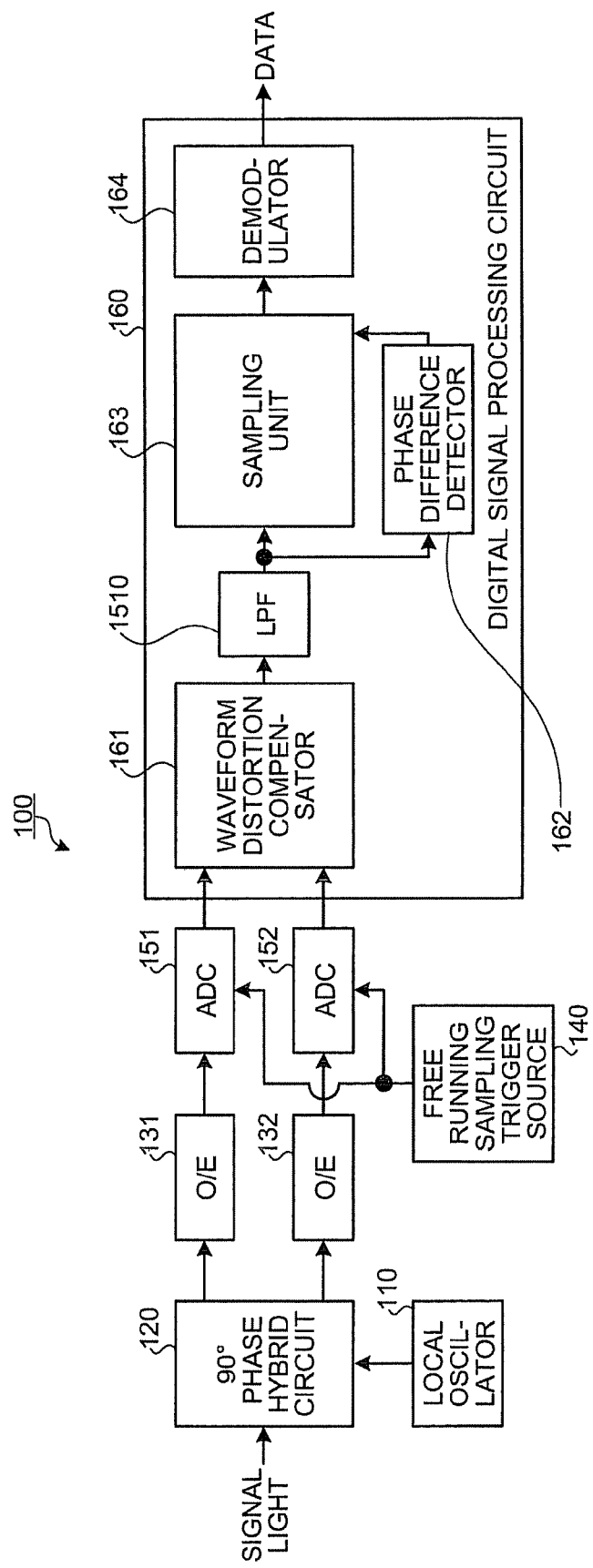
FIG. 17 is a block diagram of an optical receiving apparatus according to a second embodiment.

FIG. 17 is a block diagram of an optical receiving apparatus according to a second embodiment. In FIG. 17, components identical to those depicted in FIG. 1 are given identical reference numerals and description thereof is omitted. As depicted in FIG. 17, the digital signal processing circuit 160 in the optical receiving apparatus 100 according to the second embodiment includes an LPF 1510 of a digital circuit in addition to the components depicted in FIG. 1.

A waveform distortion compensator 161 outputs to the LPF 1510, a complex digital signal having a waveform subjected to distortion compensation. The low pass filter (LPF) 1510 passes alone a low-frequency component in the complex digital signal output from the waveform distortion compensator 161. The complex digital signal having passed through the LPF 1510 is output a phase difference detector 162 and a sampling unit 163, respectively.

When the complex digital signal is passed through the LPF 1510, it is possible to improve an SN ratio of the complex digital signal when data is sampled with a phase shifted from the center of a symbol by the ADC 151 and the ADC 152.

Figure 18:
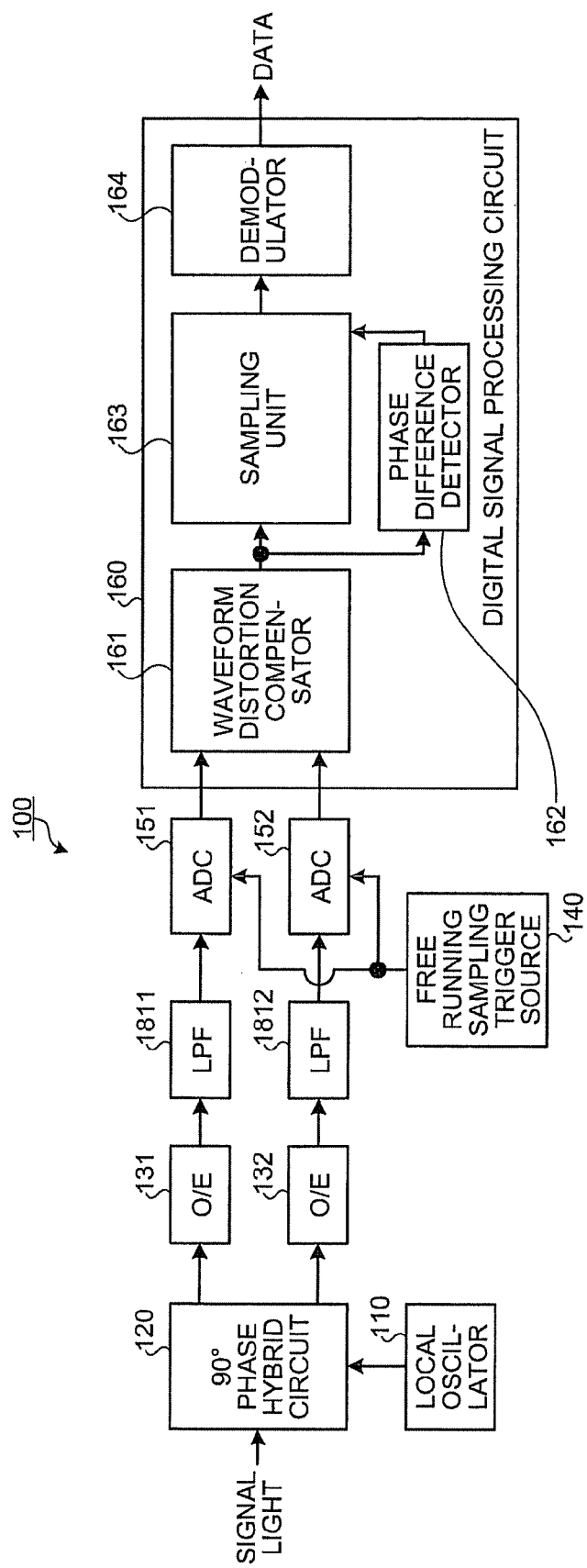
FIG. 18 is a block diagram of a modification of the optical receiving apparatus depicted in FIG. 17.

FIG. 18 is a block diagram of a modification of the optical receiving apparatus depicted in FIG. 17. In FIG. 18, components identical to those depicted in FIG. 17 are given identical reference numerals and description thereof is omitted. As depicted in FIG. 18, the optical receiving apparatus 100 may include an LPF 1811 and an LPF 1812 of an analog circuit in place of the LPF 1510 depicted in FIG. 17.

The O/E converter 131 outputs to the LPF 1811, an electrical signal corresponding to the intensity of the received light. The O/E converter 131 outputs to the LPF 1812, an electrical signal corresponding to the intensity of the received light. The LPF 1811 passes alone a low-frequency component in a complex digital signal output from the O/E converter 131, and outputs the component to the ADC 151. The LPF 1812 passes alone a low-frequency component in a complex digital signal output from the O/E converter 132, and outputs the component to the ADC 152.

When the electrical signals are passed through the LPF 1811 and the LPF 1812 on the upstream side of the ADC 151 and the ADC 152, it is possible to improve an SN ratio of a digital signal when sampled with a phase shifted from the center of a symbol by the ADC 151 and the ADC 152.

As explained, according to the optical receiving apparatus 100 of the second embodiment, the effect of the optical receiving apparatus 100 according to the first embodiment can be achieved, and the LPF 1510 or the LPFs 1811 and 1812 can improve an SN ratio of a digital signal when sampled with a phase shifted from the center of a symbol in the ADC 151 and the ADC 152.

Figure 19:
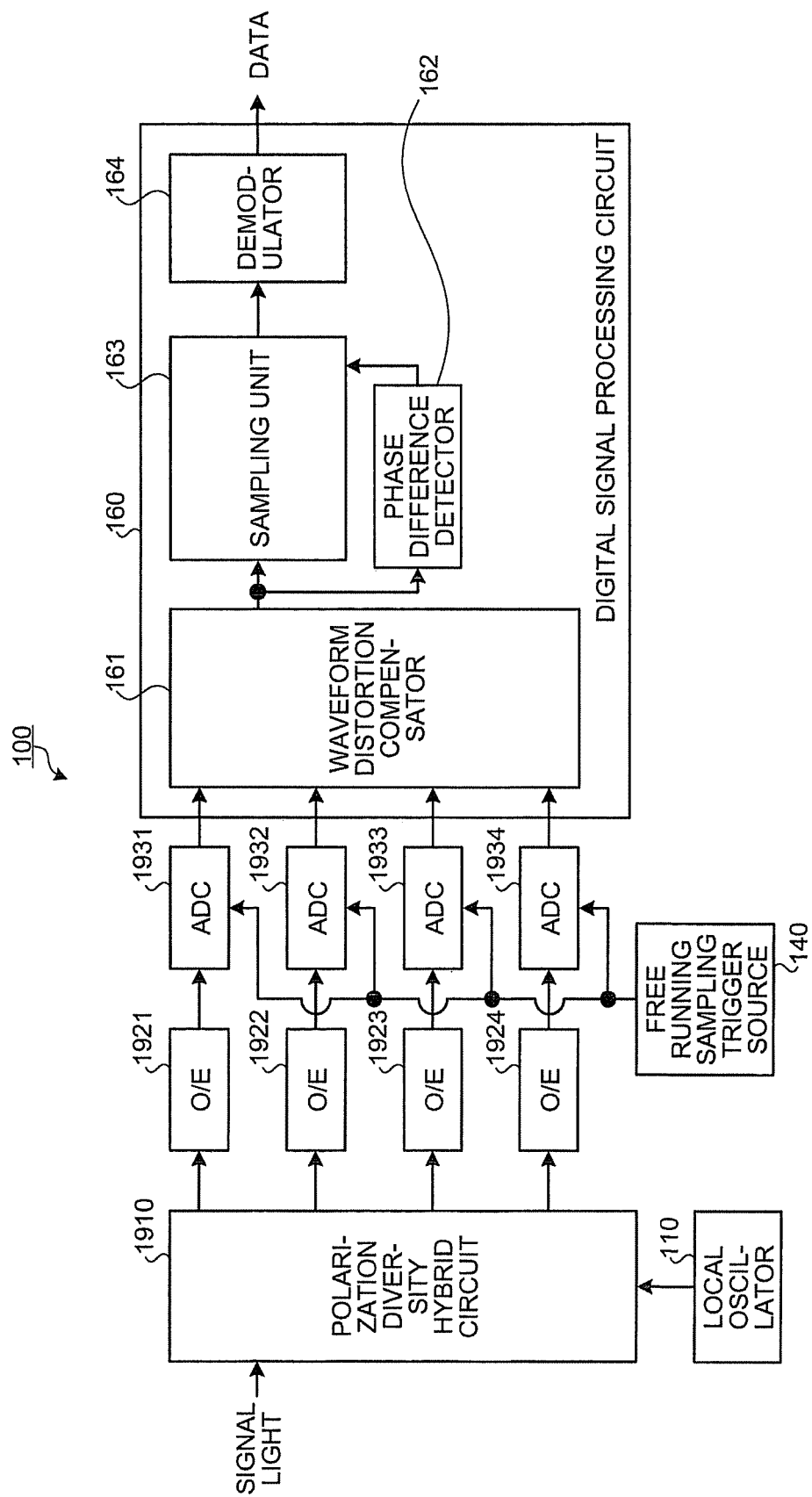
FIG. 19 is a block diagram of an optical receiving apparatus according to a third embodiment.

FIG. 19 is a block diagram of an optical receiving apparatus according to a third embodiment. In FIG. 19, components identical to those depicted in FIG. 1 are given identical reference numerals and description thereof is omitted. As depicted in FIG. 19, the optical receiving apparatus 100 according to the third embodiment includes the local oscillator 110, a polarization diversity hybrid circuit 1910, O/E converters 1921 to 1924, the free running sampling trigger source 140, ADCs 1931 to 1934, and the digital signal processing circuit 160.

The local oscillator 110 outputs local light to the polarization diversity hybrid circuit 1910. The polarization diversity hybrid circuit 1910 receives input signal light and the local light output from the local oscillator 110. The polarization diversity hybrid circuit 1910 uses the input local light to combine a first polarized wave component and a second polarized wave component as polarized wave components perpendicular to the input signal light, and extracts received optical signal complex electric field information corresponding to each polarized wave component.

The polarization diversity hybrid circuit 1910 outputs to the O/E converter 1921, light (signal I) having an intensity corresponding to a real part of a complex electric field of the first polarized wave component in the signal light. The polarization diversity hybrid circuit 1910 outputs to the O/E converter 1922, light (signal Q) having an intensity corresponding to an imaginary part of the complex electric field of the first polarized wave component in the signal light.

The polarization diversity hybrid circuit 1910 outputs to the O/E converter 1923, light (signal I) having an intensity corresponding to a real part of a complex electric field of the second polarized wave component in the signal light. The polarization diversity hybrid circuit 1910 outputs to the O/E converter 1924, light (signal Q) having an intensity corresponding to an imaginary part of the complex electric field of the second polarized wave component in the signal light.

The O/E converters 1921 to 1924 respectively receive light output from the polarization diversity hybrid circuit 1910, and output electrical signals according to the intensity of the received light to the ADCs 1931 to 1934. The free running sampling trigger source 140 outputs an oscillated clock signal to the ADCs 1931 to 1934, respectively.

The ADCs 1931 to 1934 respectively sample the electrical signals respectively output from the O/E converters 1921 to 1924 at a timing of the clock signal output from the free running sampling trigger source 140, and quantize each sampled signal, thereby performing digital conversion. The ADCs 1931 to 1934 respectively output a digital-converted complex digital signal to a digital signal processing circuit 160.

The waveform distortion compensator 161 in the digital signal processing circuit 160 compensates distortion of a waveform of a complex digital signal output from the ADCs 1931 to 1934, respectively. When signal light received by the optical receiving apparatus 100 is a signal subjected to polarization multiplexing, the waveform distortion compensator 161 performs polarization demultiplexing and then performs parallel processing with respect to the polarization demultiplexed complex digital signal to be demodulated.

Figure 20:
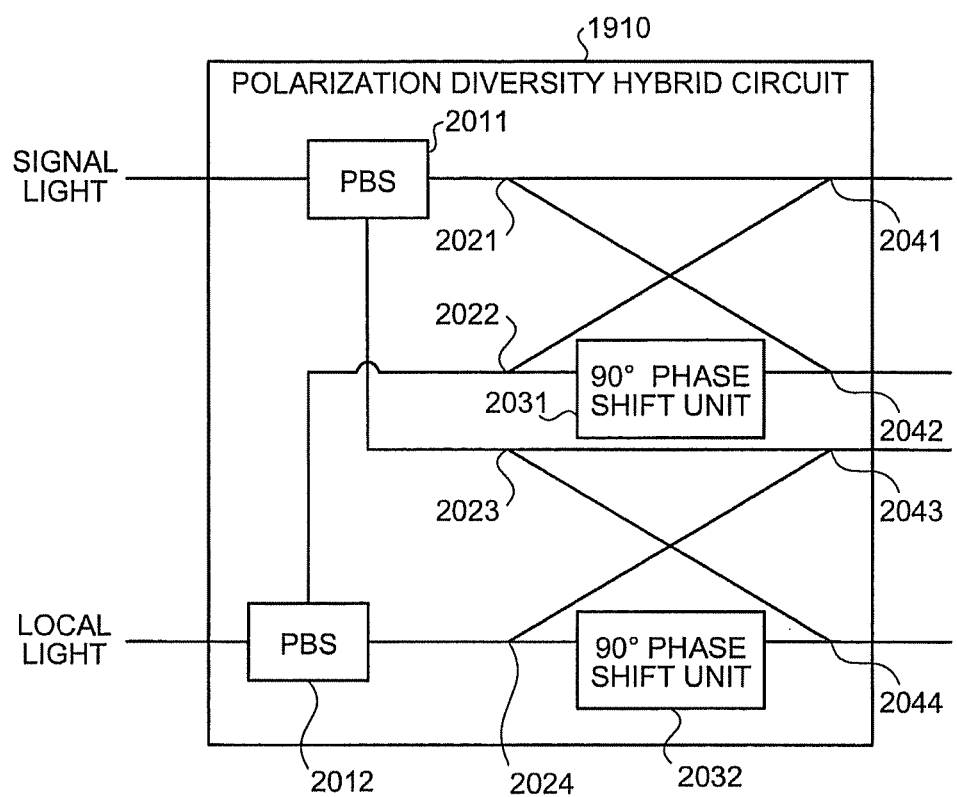
FIG. 20 is a conceptual view of a polarization diversity hybrid circuit depicted in FIG. 19.

FIG. 20 is a conceptual view of the polarization diversity hybrid circuit depicted in FIG. 19. As depicted in FIG. 20, the polarization diversity hybrid circuit 1910 includes a polarization beam splitter (PBS) 2011, a PBS 2012, branching units 2021 to 2024, a 90° phase shift unit 2031, a 90° phase shift unit 2032, and interference units 2041 to 2044.

Signal light is input to the PBS 2011 from an external source. The PBS 2011 splits the input signal light into a first polarized wave component and a second polarized wave component. The PBS 2011 outputs the first polarized wave component to the branching unit 2021, and outputs the second polarized wave component to the branching unit 2023. Local light is input to the PBS 2012 from the local oscillator 110. The PBS 2012 splits the input local light into a first polarized wave component and a second polarized wave component. The PBS 2012 outputs the first polarized wave component to the branching unit 2022, and outputs the second polarized wave component to the branching unit 2024.

The branching unit 2021 branches and outputs to the interference unit 2041 and the interference units 2042, the first polarized wave component of the signal light output from the PBS 2011. The branching unit 2022 branches and outputs to the interference unit 2041 and the 90° phase shift unit 2031, the first polarized wave component of the local light output from the PBS 2012.

The branching unit 2023 branches and outputs to the interference unit 2043 and the interference units 2044, the second polarized wave component of the signal light output from the PBS 2011. The branching unit 2024 branches and outputs to the interference unit 2043 and the 90° phase shift unit 2032, the second polarized wave component of the local light output from the PBS 2012.

The 90° phase shift unit 2031 shifts the phase of the local light output from the branching unit 2022 90°, and outputs the local light having the shifted phase to the interference unit 2042. The 90° phase shift unit 2032 shifts the phase of the local light output from the branching unit 2024 90°, and outputs the local light having the shifted phase to the interference unit 2044.

The interference unit 2041 causes the signal light output from the branching unit 2021 and the local light output from the branching unit 2022 to interfere with each other, and outputs light resulting from interference to the O/E converter 1921 as a signal I of the first polarized wave component in the signal light. The interference unit 2042 causes the signal light output from the branching unit 2021 and the local light output from the 90° phase shift unit 2031 to interfere with each other, and outputs light resulting from interference to the O/E converter 1922 as a signal Q of the first polarized wave component in the signal light.

The interference unit 2043 causes the signal light output from the branching unit 2023 and the local light output from the branching unit 2024 to interfere with each other, and outputs light resulting from interference to the O/E converter 1923 as a signal I of the second polarized wave component in the signal light. The interference unit 2044 causes the signal light output from the branching unit 2023 and the local light output from the 90° phase shift unit 2032 to interfere with each other, and outputs light resulting from interference to the O/E converter 1924 as a signal Q of the second polarized wave component in the signal light.

As explained, according to the optical receiving apparatus 100 of the third embodiment, the optical receiving apparatus 100 adopting the coherent scheme using the polarization diversity hybrid circuit 1910 can realize a high accuracy for digital conversion by using a free running clock signal like the optical receiving apparatus 100 according to the first embodiment. Thus, errors in demodulation can be reduced, and reception characteristics can be improved.

Figure 21:
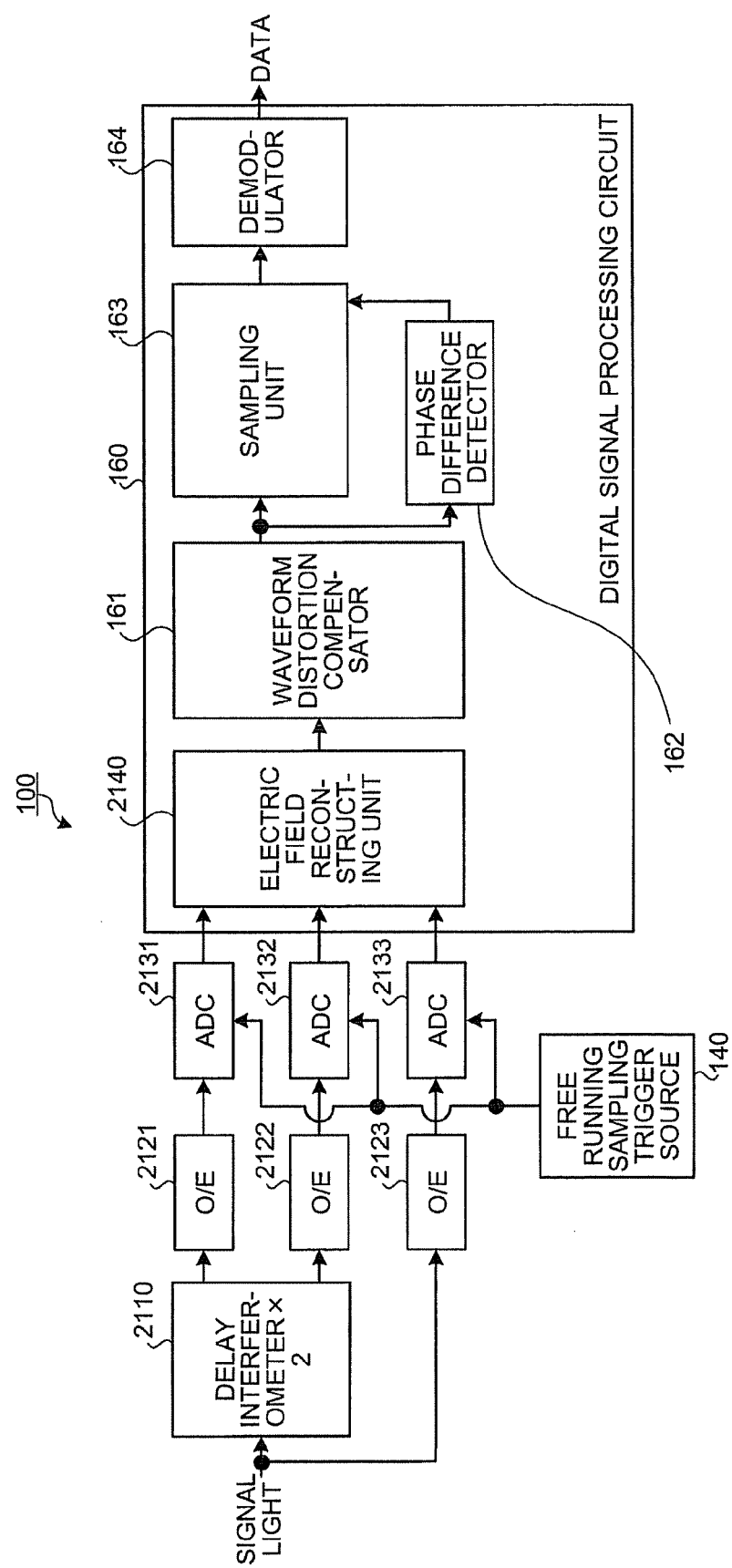
FIG. 21 is a block diagram of an optical receiving apparatus according to a fourth embodiment.

FIG. 21 is a block diagram of an optical receiving apparatus according to a fourth embodiment. In FIG. 21, components identical to those depicted in FIG. 1 are given identical reference numerals and description thereof is omitted. As depicted in FIG. 21, the optical receiving apparatus 100 according to the fourth embodiment includes a delay interferometer 2110, O/E converters 2121 to 2123, the free running sampling trigger source 140, ADCs 2131 to 2133, and the digital signal processing circuit 160.

Received signal light is input to the delay interferometer 2110. The delay interferometer 2110 is a delay interferometer obtained by combining two delay interferometers having a phase difference of 90°. The delay interferometer 2110 outputs a signal enabling reconstruction of a component I and a component Q in the input signal light. The delay interferometer 2110 outputs to the O/E converter 2121, a component in the signal light based on a signal light phase that is one symbol time previous. The delay interferometer 2110 outputs to the O/E converter 2122, a signal light component based on a phase that is 90° shifted from the signal light phase that is one symbol time previous.

The O/E converter 2121 receives light output from the delay interferometer 2110, and outputs to the ADC 2131, an electrical signal corresponding to the intensity of the received light. The O/E converter 2122 receives light output from the delay interferometer 2110, and outputs to the ADC 2132, an electrical signal corresponding to an intensity of the received light. The O/E converter 2123 receives the received signal light, and outputs to the ADC 2133, an electrical signal corresponding to the intensity of the received light.

The free running sampling trigger source 140 outputs an oscillated clock signal to the ADCs 2131 to 2133, respectively. The ADCs 2131 to 2133 respectively sample electrical signals output from the O/E converters 2121 to 2123 at a timing of a clock signal from the free running sampling trigger source 140, and quantizes each sampled signal, thereby effecting digital conversion. The O/E converters 2121 to 2123 respectively output a digital-converted complex digital signal to the digital signal processing circuit 160.

The digital signal processing circuit 160 includes an electric field reconstructing unit 2140 in addition to the components depicted in FIG. 1. The electric field reconstructing unit 2140 performs electric field reconstruction of a complex digital signal output from the ADC 2131 and the ADC 2132. Specifically, the electric field reconstructing unit 2140 divides a complex digital signal output from the ADC 2131 and the ADC 2132 by a complex digital signal output from the ADC 2133 to reconstruct complex electric field information concerning an electric field. The electric field reconstructing unit 2140 outputs a complex digital signal resulting from electric field reconstruction to the waveform distortion compensator 161.

Figure 22:
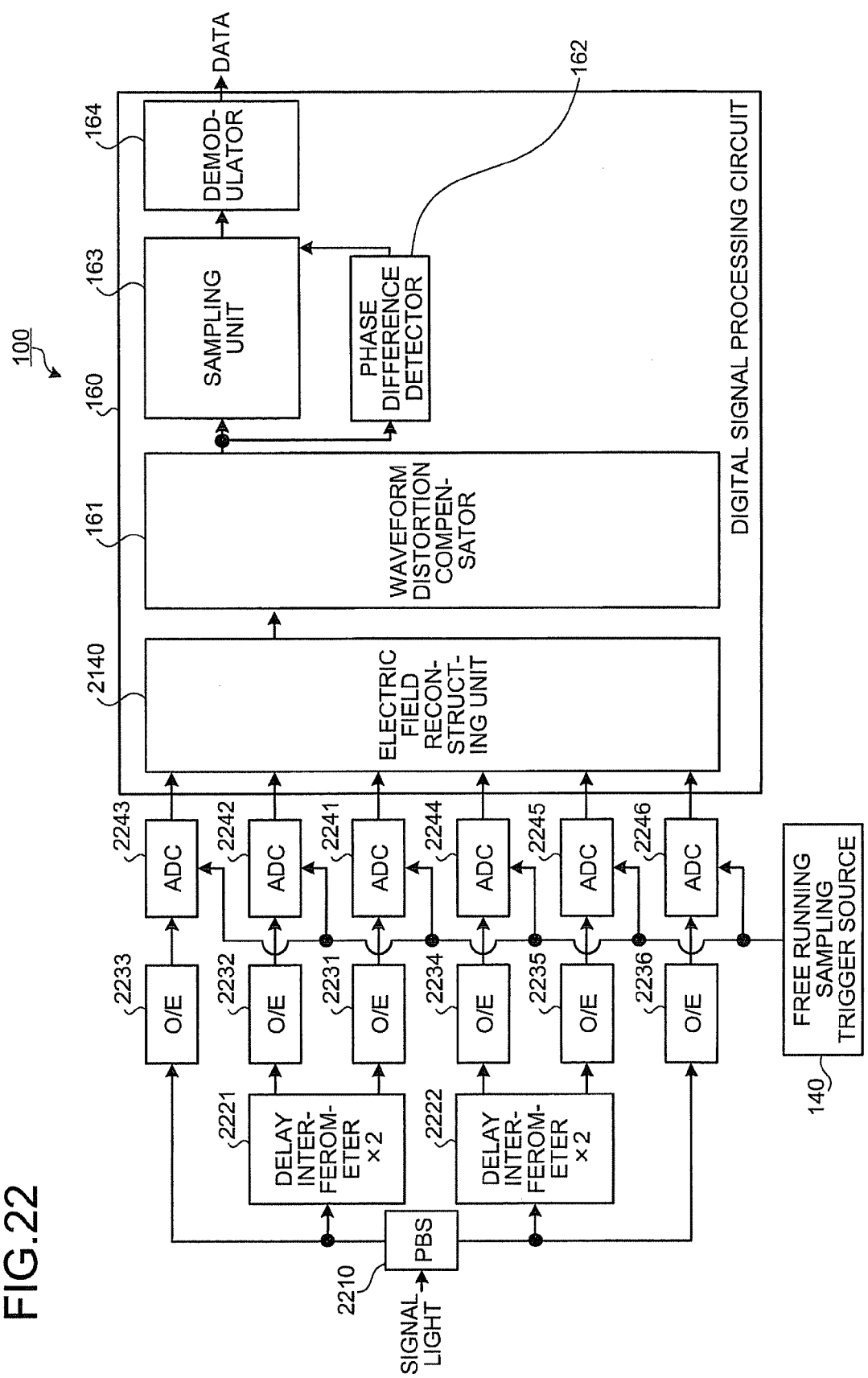
FIG. 22 is a block diagram of a modification of the optical receiving apparatus depicted in FIG. 21.

FIG. 22 is a block diagram of a modification of the optical receiving apparatus depicted in FIG. 21. In FIG. 22, components identical to those depicted in FIG. 21 are given identical reference numerals and description thereof is omitted. The optical receiving apparatus 100 may include a PBS 2210, a delay interferometer 2221, a delay interferometer 2222, O/E converters 2231 to 2236, the free running sampling trigger source 140, ADCs 2241 to 2246, and the digital signal processing circuit 160.

Received signal light is input to the PBS 2210. The PBS 2210 splits the input signal light into two polarized wave components perpendicular to each other. The PBS 2210 outputs a first polarized wave component to the delay interferometer 2221 and the O/E converter 2233. The PBS 2210 outputs a second polarized wave component to the delay interferometer 2222 and the O/E converter 2236.

The delay interferometer 2221, the O/E converters 2231 to 2233, and the ADCs 2241 to 2243 have the same configurations as the delay interferometer 2110, the O/E converters 2121 to 2123, and the ADCs 2131 to 2133 depicted in FIG. 21. The delay interferometer 2221, the O/E converters 2231 to 2233, and the ADCs 2241 to 2243 output to the digital signal processing circuit 160, a complex digital signal representing a signal enabling reconstruction of complex electric field information concerning signal light having the first polarized wave component output from the PBS 2210.

The delay interferometer 2222, the O/E converters 2234 to 2236, and the ADCs 2244 to 2246 have the same configurations as the delay interferometer 2110, the O/E converters 2121 to 2123, and the ADCs 2131 to 2133 depicted in FIG. 21. The delay interferometer 2222, the O/E converters 2234 to 2236, and the ADCs 2244 to 2246 output to the digital signal processing circuit 160, a complex digital signal representing a signal enabling reconstruction of complex electric field information concerning signal light having the second polarized wave component output from the PBS 2210.

The free running sampling trigger source 140 outputs an oscillated clock signal to the ADCs 2241 to 2246. The electric field reconstructing unit 2140 in the digital signal processing circuit 160 performs electric field reconstruction with respect to a complex digital signal output from each of the ADC 2241 and the ADC 2242 and a complex digital signal output from each of the ADC 2244 and the ADC 2245.

Specifically, the electric field reconstructing unit 2140 reconstructs an electric field by dividing a complex digital signal output from each of the ADC 2241 and the ADC 2242 by a complex digital signal output from the ADC 2243. The electric field reconstructing unit 2140 reconstructs an electric field by dividing a complex digital signal output from each of the ADC 2244 and the ADC 2245 by a digital signal output from the ADC 2246.

As explained, according to the optical receiving apparatus 100 of the fourth embodiment, the optical receiving apparatus 100 adopting the self-coherent scheme using the delay interferometer 2110 or the delay interferometers 2221 and 2222 can realize a high accuracy for digital conversion by using a free running clock signal like the optical receiving apparatus 100 according to the first embodiment. Thus, errors in demodulation can be reduced, and reception characteristics can be improved.

As explained, according to the embodiments, performance of a digital coherent receiver can be improved. Although an example where signal light received by the optical receiving apparatus 100 is RZ-pulsed signal light is explained in each of the foregoing embodiments, the optical receiving apparatus 100 can be likewise used with respect to signal light that is not RZ-pulsed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical receiving apparatus comprising:
a combining unit that combines signal light and reference light;
an optoelectric converting unit that converts, into electrical signals, two or more optical signals that enable reconstruction of a complex electric field signal of the signal light obtained by the combining unit;
a free-running sampling clock generating unit that generates a free-running sampling clock that has a frequency preset based on a symbol rate of the signal light and is asynchronous with the signal light;
a digital converting unit that samples at the frequency of the free-running sampling clock signal, an electrical signal obtained by the optoelectric converting unit and converts the electrical signal into a digital signal; and
a digital signal processing unit that demodulates a received signal based on a complex digital signal obtained from the digital signal obtained by the digital converting unit,
wherein the digital signal processing unit includes:
a detecting unit that detects a phase difference between the symbol rate of the signal light and the free-running sampling clock signal, and
a sampling unit that, based on the phase difference detected by the detecting unit, samples the complex digital signal at a frequency that is an integral multiple of a half of a sampling rate,
wherein the digital signal processing unit uses the complex digital signal sampled by the sampling unit to demodulate the received signal, and
wherein the sampling unit includes a decimation/interpolation unit that thins out a signal from the complex digital signal or inserts a signal into the complex digital signal so as to perform sampling at a frequency that is an integral multiple of a half of a frequency of the signal light.

2. The optical receiving apparatus according to claim 1, wherein
the digital signal processing unit includes a compensating unit that performs waveform distortion compensation with respect to the complex digital signal,
the sampling unit samples based on the complex digital signal subjected to waveform distortion compensation by the compensating unit, and
the detecting unit detects the phase difference, based on the complex digital signal subjected to waveform distortion compensation by the compensating unit.

3. The optical receiving apparatus according to claim 2, further comprising
a determining unit that determines a compensation parameter based on the complex digital signal sampled by the sampling unit, wherein
the compensating unit uses the compensation parameter determined by the determining unit to perform waveform distortion compensation.

4. The optical receiving apparatus according to claim 1, wherein the sampling unit includes a down-sampling unit that down-samples such that the complex digital signal has a sampling rate of the signal light.

5. The optical receiving apparatus according to claim 4, wherein the down-sampling unit includes:
a demultiplexing unit that time-demultiplexes the complex digital signal into to two signals;

an average calculating unit that averages signal intensities for each of the signals resulting from time-demultiplexing by the demultiplexing unit; and a selector that selects and samples, among the signals resulting from time-demultiplexing by the demultiplexing unit, a signal having a larger average signal intensity calculated by the average calculating unit.

6. The optical receiving apparatus according to claim 4, wherein the down-sampling unit includes:

a demultiplexing unit that time-demultiplexes the complex digital signal into to two signals;

an adding unit that adds the signals resulting from time-demultiplexing by the demultiplexing unit.

7. The optical receiving apparatus according to claim 1, wherein the decimation/interpolation unit includes:

a calculating unit that calculates a frequency of the signal light based on the phase difference detected by the detecting unit and the frequency of the free-running sampling clock signal, and a flip flop circuit that performs retiming with respect to the complex digital signal at a frequency calculated by the calculating unit.

8. The optical receiving apparatus according to claim 1, wherein the decimation/interpolation unit includes:

a threshold judging unit that integrates the phase difference detected by the detecting unit and outputs a signal each time an integrated value exceeds a predetermined threshold;

a calculating unit that calculates a frequency of the signal light based on a frequency of the signal output by the threshold judging unit and the frequency of the sampling clock signal; and a buffer that stores the complex digital signal, outputs a stored digital signal at a frequency calculated by the calculating unit, and erases a stored complex digital signal each time the threshold judging unit outputs a signal to thin out the signal.

9. The light receiving unit according to claim 1, further comprising:

a demultiplexing unit that time-demultiplexes the complex digital signal into digital signals having a frequency of the signal light; and a differential calculating unit that calculates a derivative of the complex digital signal subjected to time-demultiplexing by the time-demultiplexing unit, wherein the decimation/interpolation unit includes:

a sign inversion judging unit that outputs a signal each time any one of respective derivatives calculated by the differential calculating unit changes from a negative value to a positive value, a calculating unit that calculates a symbol rate of the signal light based on a frequency of the signal output by the sign inversion judging unit and the frequency of the clock signal, and a buffer that stores a digital signal obtained by the digital converting unit, outputs a stored complex digital signal at a symbol rate calculated by the calculating unit, and erases a stored complex digital signal each time the sign inversion judging unit outputs a signal.

10. The optical receiving apparatus according to claim 1, further comprising a low-pass filter that passes a low-frequency component in the complex digital signal, wherein the digital signal processing unit demodulates the low-frequency component that passes through the low-pass filter.

11. The optical receiving apparatus according to claim 1, further comprising a low-pass filter that passes a low-frequency component in the electrical signal converted by the optoelectric converting unit, wherein the digital converting unit samples a signal that passes through the low-pass filter.

12. The optical receiving apparatus according to claim 1, wherein the free-running sampling clock generating unit oscillates a clock signal having a frequency larger than an integral multiple of a half of a frequency of the signal light.

13. A digital receiving circuit that demodulates a received signal by using a complex digital signal, the digital receiving circuit comprising:

a sampling unit that samples, at a frequency that is an integral multiple of a half of a symbol rate of a signal light, the complex digital signal obtained by another device that samples, at a frequency different from the integral multiple of the half of the symbol rate of the signal light, an electrical signal that enables reconstruction of a complex electric field signal of the signal light; and a demodulating unit that demodulates the received signal by using the complex digital signal sampled by the sampling unit, wherein the sampling unit includes a decimation/interpolation unit that thins out a signal from the complex digital signal or inserts a signal into the complex digital signal so as to perform sampling at a frequency that is an integral multiple of a half of a frequency of the signal light.

* * * * *